(12) United States Patent
Wells et al.

(10) Patent No.: US 12,291,053 B2
(45) Date of Patent: May 6, 2025

(54) EVALUATING THREE-DIMENSIONAL SECURITY FEATURES ON DOCUMENT IMAGES

(71) Applicant: Jumio Corporation, Sunnyvale, CA (US)

(72) Inventors: Stuart Wells, Saratoga, CA (US); Attila Balogh, Vienna (AT); Anshuman Vikram Singh, Vienna (AT); Thomas Krump, Buchkirken (AT); Daryl Huff, Saratoga, CA (US)

(73) Assignee: Jumio Corporation, Sunnyvale, CA (US)

( * ) Notice: Subject to any disclaimer, the term of this patent is extended or adjusted under 35 U.S.C. 154(b) by 0 days.

(21) Appl. No.: 18/193,732

(22) Filed: Mar. 31, 2023

(65) Prior Publication Data
US 2024/0217256 A1 Jul. 4, 2024

Related U.S. Application Data

(63) Continuation-in-part of application No. 18/148,542, filed on Dec. 30, 2022, and a continuation-in-part of
(Continued)

(51) Int. Cl.
*B42D 25/333* (2014.01)
*G06T 5/50* (2006.01)
(Continued)

(52) U.S. Cl.
CPC ............ *B42D 25/333* (2014.10); *G06T 5/50* (2013.01); *G06T 7/13* (2017.01); *G06V 30/414* (2022.01); *G06T 2207/20221* (2013.01)

(58) Field of Classification Search
CPC ........... B42D 25/333; G06T 5/50; G06T 7/13; G06T 2207/20221; G06V 30/414
(Continued)

(56) References Cited

U.S. PATENT DOCUMENTS 4,897,814 A 1/1990 Clark
5,544,255 A 8/1996 Smithies et al.
(Continued)

FOREIGN PATENT DOCUMENTS

MY 192715 A 9/2022

OTHER PUBLICATIONS

Shokat, Sana, et al. "Analysis and Evaluation of Braille to Text Conversion Methods." Mobile Information Systems, vol. 2020, 2020, pp. 1-14.
(Continued)

*Primary Examiner* — Justin V Lewis
(74) *Attorney, Agent, or Firm* — Patent Law Works LLP

(57) ABSTRACT

The disclosure includes a system and method for obtaining at least one image of a document under test, wherein valid instances of the document under test include at least one three-dimensional security feature; obtaining a first image snippet from the document under test, the first image snippet corresponding to at least a first portion of the three-dimensional security feature present in the valid instances of the document; deriving first dimensional data associated with the first image snippet; analyzing the first dimensional data to determine one or more of: whether the first dimensional data is consistent with a presence of the three-dimensional security feature, and whether the first dimensional data is
(Continued)

consistent with second dimensional data; and modifying a likelihood that the document under test is accepted as valid, or rejected as invalid, based on the analysis of the first dimensional data.

20 Claims, 26 Drawing Sheets

Related U.S. Application Data application No. 18/148,544, filed on Dec. 30, 2022, and a continuation-in-part of application No. 18/148,536, filed on Dec. 30, 2022.

(51) Int. Cl.
*G06T 7/13* (2017.01)
*G06V 30/414* (2022.01)

(58) Field of Classification Search
USPC .... 283/67, 70, 72, 93, 94, 98, 105, 117, 901
See application file for complete search history.

(56) References Cited

U.S. PATENT DOCUMENTS

| | | | |
|---|---|---|---|
| 5,668,897 | A | 9/1997 | Stolfo |
| 5,748,780 | A | 5/1998 | Stolfo |
| 6,363,162 | B1 | 3/2002 | Moed et al. |
| 7,040,539 | B1 | 5/2006 | Stover |
| 7,831,531 | B1 | 11/2010 | Baluja et al. |
| 8,326,761 | B1 | 12/2012 | Hecht et al. |
| 8,352,494 | B1 | 1/2013 | Badoiu |
| 8,886,648 | B1 | 11/2014 | Procopio et al. |
| 9,135,517 | B1 | 9/2015 | Adams |
| 11,416,562 | B1 | 8/2022 | Gruhl et al. |
| 11,593,439 | B1 | 2/2023 | Avadhani et al. |
| 11,715,102 | B2 | 8/2023 | Edwards et al. |
| 11,900,755 | B1 | 2/2024 | Bueche, Jr. |
| 2003/0172066 | A1 | 9/2003 | Cooper et al. |
| 2006/0041506 | A1 | 2/2006 | Mason et al. |
| 2006/0124726 | A1 | 6/2006 | Kotovich et al. |
| 2007/0078846 | A1 | 4/2007 | Gulli et al. |
| 2007/0086628 | A1 | 4/2007 | Fuchs et al. |
| 2007/0116328 | A1 | 5/2007 | Sablak |
| 2008/0065630 | A1 | 3/2008 | Luo et al. |
| 2008/0149713 | A1 | 6/2008 | Brundage |
| 2009/0261158 | A1 | 10/2009 | Lawson |
| 2010/0027896 | A1 | 2/2010 | Geva et al. |
| 2011/0057040 | A1 | 3/2011 | Jones |
| 2014/0002872 | A1 | 1/2014 | Cook |
| 2015/0100590 | A1 | 4/2015 | Robinson et al. |
| 2015/0242592 | A1 | 8/2015 | Weiss et al. |
| 2016/0005050 | A1 | 1/2016 | Teman |
| 2016/0098399 | A1 | 4/2016 | Casperson |
| 2016/0210450 | A1 | 7/2016 | Su |
| 2017/0161375 | A1 | 6/2017 | Stoica et al. |
| 2017/0193285 | A1 | 7/2017 | Negi |
| 2017/0337449 | A1 | 11/2017 | Hamada et al. |
| 2018/0075090 | A1 | 3/2018 | Knight et al. |
| 2018/0186164 | A1 | 7/2018 | Wu |
| 2018/0204113 | A1 | 7/2018 | Galron et al. |
| 2018/0293461 | A1 | 10/2018 | Le et al. |
| 2018/0300296 | A1 | 10/2018 | Ziraknejad et al. |
| 2018/0373859 | A1 | 12/2018 | Ganong |
| 2019/0035431 | A1 | 1/2019 | Attorre |
| 2019/0272549 | A1 | 9/2019 | Mossoba et al. |
| 2019/0278986 | A1* | 9/2019 | Nepomniachtchi .... G06V 30/40 |
| 2020/0184201 | A1 | 6/2020 | Kaehler |
| 2020/0304650 | A1 | 9/2020 | Roach |
| 2020/0366671 | A1 | 11/2020 | Larson et al. |
| 2021/0124919 | A1 | 4/2021 | Balakrishnan |
| 2021/0320801 | A1 | 10/2021 | Wyss |
| 2021/0326629 | A1 | 10/2021 | Slattery |
| 2022/0028086 | A1 | 1/2022 | Woodard et al. |
| 2022/0058660 | A1 | 2/2022 | Ivanov |
| 2022/0385880 | A1 | 12/2022 | Nims |
| 2023/0017185 | A1 | 1/2023 | Cheong et al. |
| 2023/0113148 | A1* | 4/2023 | Zlotnick .................. B41M 1/10 283/72 |
| 2023/0129350 | A1 | 4/2023 | Bryan et al. |

OTHER PUBLICATIONS

Shokat, Sana, et al. "Characterization of English Braille Patterns Using Automated Tools and RICA Based Feature Extraction Methods." Sensors (Basel, Switzerland), vol. 22, No. 5, 2022, p. 1836.

PCT International Search Report and Written Opinion; Application No. PCT/US23/79821 Jumio Corporation, International filing date of Nov. 15, 2023, date of mailing Apr. 4, 2024, 10 pages.

"7 Best Face Morph Apps 2024 (Morph Two Faces Together)." ContentMaverickscom, Content Mavericks, 2024, contentmavericks.com/best-face-morph-app/. 2024 Web. 25 pgs. 2024.

"Levenshtein Distance." Wikipedia, Wikimedia Foundation, Dec. 23, 2023, en.wikipedia.org/wiki/Levenshtein_distance. Web. 6 pgs. 2023.

"New Method Detects Deepfake Videos with up to 99% Accuracy." News, May 3, 2022, news.ucr.edu/articles/2022/05/03/new-method-detects-deepfake-videos-99-accuracy. Web. 3 pgs. 2022.

Bassil, Youssef, and Mohammad Alwani. "Context-Sensitive Spelling Correction Using Google Web 1T 5-Gram Information." Computer and Information Science (Toronto), vol. 5, No. 3, 2012, p. 37. 2012.

Bassil, Youssef, and Mohammad Alwani. "OCR Post-Processing Error Correction Algorithm Using Google Online Spelling Suggestion." ArXiv.org, 2012, pp. arXiv.org, 2012. 2012.

Benalcazar, Daniel, et al. "Synthetic ID Card Image Generation for Improving Presentation Attack Detection." IEEE Transactions on Information Forensics and Security, vol. 18, 2023, pp. 1814-1824. 2023.

Casado, Constantino Alvarez, et al. "Real-time Face Alignment: Evaluation Methods, Training Strategies and Implementation Optimization." Journal of Real-time Image Processing 18.6 (2021): 2239-2267. Web. 2021.

Deepswap.AI, "Deepswap—Best Face and Video Edit Tools Online." DeepSwap AI, www.deepswap.ai/?utm_source=bing&cp_id=441169896&msclkid=eb76125c4d531cf9797e77325a694067. Accessed Dec. 2023. Web. 11 pgs. 2023.

DevCodeF1 Editors, Using LLMS for OCR text proofreading: A guide for software developers. Dev Code F1. May 26, 2023, <https://devcodef1.com/news/1007434/llms-for-ocr-text-proofreading> Web. 3 pgs. 2023.

Faceshape. "Face Morphing Simulator—Morph Two Faces Together." Face Morphing Simulator—Morph Two Faces Together, www.faceshape.com/face-morph. (2022) Web. 2 pgs. 2022.

Fadilpaić, Sead. "Deepfake Fraud Attacks Are Hitting More and More Businesses." TechRadar, TechRadar Pro, Feb. 24, 2023, www.techradar.com/news/deepfake-fraud-attacks-are-hitting-more-and-more-businesses. Accessed Jan. 12, 2024. Web. 8 pgs. 2023.

GitHub, Use Llama2 to Improve the Accuracy of Tesseract OCR. GitHub. (n.d.). https://github.com/Dicklesworthstone/llama2_aided_tesseract> Web. Last updated Aug. 2, 2023. 3 pgs. 2023.

Help Net Security. "Detecting Face Morphing: A Simple Guide to Countering Complex Identity Fraud." Help Net Security, Mar. 16, 2023, www.helpnetsecurity.com/2023/03/20/facial-morphing-technology/. Web. 5 pgs. 2023.

Hu, Yifei, et al. "Misspelling Correction with Pre-Trained Contextual Language Model." ArXiv.org, 2021, pp. arXiv.org, 2021. 2021.

Kaspersky, Secure Futures Editors. "What Does the Rise of Deepfakes Means for the Future of Cybersecurity?" Daily English USA Usakasperskycomblog, Kaspersky Secure Futures Editors, usa.kaspersky.com/blog/secure-futures-magazine/deepfakes—2019/21932/.

Kramer, Robin S. S., et al. "Face Morphing Attacks: Investigating Detection with Humans and Computers." Cognitive Research: Principles and Implications, vol. 4, No. 1, 2019, p. 28. 2019.

(56) References Cited

OTHER PUBLICATIONS

Kumar, Varun. "14 Best Deepfake Apps and Tools in 2024." RankRed, Jan. 1, 2024, www.rankred.com/best-deepfake-apps-tools/. Web. 22 pgs. 2024.

Lee, Jung-Hun, et al. "Deep Learning-Based Context-Sensitive Spelling Typing Error Correction." IEEE Access, vol. 8, 2020, pp. 152565-152578. 2020.

Liu, Zhaoxiang, et al. "Facial Pose Estimation by Deep Learning from Label Distributions." (2019). Web. IEEE/CVF International Conference on Computer Vision Workshop (ICCVW), 9 pgs. 2019.

Lowphansirkul, Lalita, et al. "WangchanBERTa: Pretraining Transformer-Based Thai Language Models." ArXiv.org, 2021, pp. arXiv.org, 2021. 2021.

Luo, Yinhui et al. "A Review of Homography Estimation: Advances and Challenges." Electronics 2023 pp. 4977-4977. https://www.mdpi.com/2079-9292/12/24/4977 2023.

Lyu, Siwei, "Detecting 'deepfake' Videos in the Blink of an Eye." The Conversation, Sep. 15, 2022, theconversation.com/detecting-deepfake-videos-in-the-blink-of-an-eye-101072. Web. 4 pgs. 2022.

Mazaheri, Ghazal et al. "2022 Ieee/Cvf Winter Conference on Applications of Computer Vision (Wacv)." Detection and Localization of Facial Expression Manipulations IEEE 2022 pp. 2773-2783 2022.

Nightingale, Sophie J., et al. "Perceptual and Computational Detection of Face Morphing." Journal of Vision (Charlottesville, Va.), vol. 21, No. 3, 2021, p. 4. 2021.

Picsi.Ai, "Create Realistic Face Morphs" Picsi.Ai, InsightFace, 2023, www.picsi.ai/. Web. 8 pgs. 2023.

Rosebrock, A. (Nov. 16, 2021). OCR passports with opencv and Tesseract. PylmageSearch. <https://pyimagesearch.com/2021/12/01/ocr-passports-with-opencv-and-tesseract/> Web. 24 pgs. 2021.

Sadeghzadeh, Arezoo, et al., "Pose-invariant face recognition based on matching the occlusion free regions aligned by 3D generic model." IET Computer Vision, Aug. 2020, vol. 14, Issue 5, pp. 177-287. 2020.

Schulz, Daniel, et al., "Identify Documents Image Quality Assessment." European Association for Signal Processing, Proceedings 2022 pp. 1017-1021. 2022.

Seibold, C., et al., "Detection of Face Morphing Attacks by Deep Learning." Digital Forensics and Watermarking. IWDW (2017). Lecture Notes in Computer Science(), vol. 10431. Springer, Cham. https://doi.org/10.1007/978-3-319-64185-0_9 2017.

Tesseract—OCR, Improving the Quality of the Output Github.com, Tesseract User Manual v. 5.x, 9 pgs, updated Dec. 5, 2023. Web. 2023.

Times, Global. "Tencent Launches Large Language Model 'Hunyuan' amid Global Generative Ai Frenzy." Global Times, Sep. 7, 2023, www.globaltimes.cn/page/202309/1297761.shtml. 6 pgs. 2023.

Youtube, YouTube, "Morphing Identity: A real-time face morphing system to transforming face identity." May 15, 2021, Cybernetic Humanity Studio. https://youtu.be/ahKxwaJ3k_U?si=kp4G4wFa8IAsGNLY 2021.

Zhao, Jian et al. "2018 Ieee/Cvf Conference on Computer Vision and Pattern Recognition." Towards Pose Invariant Face Recognition in the Wild IEEE 2018 pp. 2207-2216. 2018.

PCT International Search Report and Written Opinion; Application No. PCT/US23/79511 Jumio Corporation, International filing date of Nov. 13, 2023, date of mailing Mar. 4, 2024, 17 pages.

Aslam, Asra, et al., May 15, 2019, Depth-Map Generation using Pixel Matching in Stereoscopic Pair of Images, https://arxiv.org/pdf/1902.03471.pdf, 5 pgs.

Elsayed, M et al. "A New Method for Full Reference Image Blur Measure." International Journal of Simulation: Systems Science and Technology V19 N1 (Feb. 1, 2018): 7.1-7.5 2018 https://doi.org/10.5013/IJSSST.a.19.01.7.

Canada Passport Phot Security Features, Canada.ca, Government of Canada (Dec. 20, 2022) https://www.canada.ca/en/immigration-refugees-citizenship/services/canadian-passports/photos.html#/photo, webpage 11 pgs.

Edge Detection Using OpenCV, LearnOpenCV.com, (2023) https://learnopencv.com/edge-detection-using-opencv/, webpage. 10 pgs.

Passport Phot Specifications., Government of Canada (2015) https://www.canada.ca/content/dam/ircc/migration/ircc/english/pdf/pub/pass-photo-spec-eng.pdf, 5 pgs.

Rosebrock, Adrian, "OpenCV Fast Fourier Transform (FFT) for blur detection in images and video streams." PyImageSearch.com, Jun. 15, 2020, webpage, 21 pgs. https://pyimagesearch.com/2020/06/15/opencv-fast-fourier-transform-fft-for-blur-detection-in-images-and-video-streams/.

"Rosebrock, Adrian, Blur Detection with OpenCV" PyImageSearch.com, Sep. 7, 2015, https://pyimagesearch.com/2015/09/07/blur-detection-with-opencv/, webpage, 13 pgs.

Zhang, Erhu, et al. "Forgery Detection for Perforated Number in Security Document by Analysing the Perforated Holes." The Imaging Science Journal 65.1 (2017): 40-48. Web.

Di Guardo, Fabrizio. "Facemask—a Real-Time Face Morphing Tool." Medium, Level Up Coding, May 2, 2023, levelup.gitconnected.com/facemask-a-real-time-face-morphing-tool-5b343591a237. May 2, 2023.

"Face Landmark Detection Guide | Google Ai Edge | Google AI for Developers." Google, ai.google.dev/edge/mediapipe/solutions/vision/face_landmarker.

"Image Segmentation Guide | Google Ai Edge | Google AI for Developers." Google, ai.google.dev/edge/mediapipe/solutions/vision/image_segmenter.

Kirillov, Alexander et al. "Segment Anything." 2023 IEEE/CVF International Conference on Computer Vision (ICCV), Oct. 1, 2023, doi:10.1109/iccv51070.2023.00371. Oct. 1, 2023.

"Large Language and Vision Assistant." LLaVA, llava-vl.github.io/.

Liu, Haotian, et al. "Visual Instruction Tuning." 37th Conference on Neural Information Processing Systems, Dec. 11, 2023, arxiv.org/pdf/2304.08485. Dec. 11, 2023.

"Llava 1.6—a Hugging Face Space by Liuhaotian." LLaVA 1.6—a Hugging Face Space by Liuhaotian, huggingface.co/spaces/liuhaotian/LLaVA-1.6.

Wang, Xin, et al. "Attribute-Aware Implicit Modality Alignment for Text Attribute Person Search." Arxiv. Org, Jun. 6, 2024. Jun. 6, 2024.

Wang, Zhe, et al. "Attribute-guided Transformer for Robust Person Re-identification." IET Computer Vision, vol. 17, No. 8, Jun. 23, 2023, pp. 977-992, doi:10.1049/cvi2.12215. Jun. 23, 2023.

PCT International Search Report and Written Opinion; Application No. PCT/US23/86219 Jumio Corporation, International filing date of Dec. 28, 2023, date of mailing May 23, 2024, 4 pages.

PCT International Search Report and Written Opinion; Application No. PCT/US2024/048525 Jumio Corporation, International filing date of Sep. 26, 2024, date of mailing Nov. 27, 2024, 10 pages. 2024.

PCT International Search Report and Written Opinion; Application No. PCT/US24/62269 Jumio Corporation, International filing date of Dec. 30, 2024, date of mailing Mar. 7, 2025, 11 pages.

\* cited by examiner

```
802 ─┤[{'description': 'California',
      'boundingPoly': {'vertices': [{'x': 42, 'y': 30},
        {'x': 335, 'y': 24},
        {'x': 336, 'y': 82},
        {'x': 43, 'y': 88}]}},
804 ─┤ {'description': 'USA',
      'boundingPoly': {'vertices': [{'x': 329, 'y': 24},
        {'x': 380, 'y': 23},
        {'x': 381, 'y': 81},
        {'x': 330, 'y': 82}]}},
806 ─┤ {'description': 'DRIVER',
      'boundingPoly': {'vertices': [{'x': 414, 'y': 22},
        {'x': 524, 'y': 20},
        {'x': 525, 'y': 78},
        {'x': 415, 'y': 80}]}},
808 ─┤ {'description': 'LICENSE',
      'boundingPoly': {'vertices': [{'x': 532, 'y': 20},
        {'x': 656, 'y': 17},
        {'x': 657, 'y': 75},
        {'x': 533, 'y': 78}]}},
810 ─┤ {'description': 'DL',
      'boundingPoly': {'vertices': [{'x': 304, 'y': 130},
        {'x': 334, 'y': 129},
        {'x': 335, 'y': 159},
        {'x': 305, 'y': 160}]}},
812 ─┤ {'description': '11234568',
      'boundingPoly': {'vertices': [{'x': 340, 'y': 129},
        {'x': 502, 'y': 125},
        {'x': 503, 'y': 155},
        {'x': 341, 'y': 159}]}},
814 ─┤ {'description': 'EXP',
      'boundingPoly': {'vertices': [{'x': 307, 'y': 175},
        {'x': 346, 'y': 175},
        {'x': 346, 'y': 200},
        {'x': 307, 'y': 200}]}},
```

Figure 8

```
"documentType": "ID_CARD",
"country": "███",
"state": null,
"documentSubtype": "NATIONAL_ID",
"documentVersion": "Paper No Format",
"printedDocumentName": "Carte Nationale D'identite",
"properties": {
    "physicalProperties": {
        "backRequired": true
    },
    "documentProperties": {
        "documentTier": "2"
    }
},
"fields": {
    "documentNumber": {
        "type": "string",
        "minLength": 0,
        "maxLength": 60,
        "mandatory": true,
        "jumboUiSettings": {
            "view": 1,
            "order": 100,
            "label": "Document Number"
        },
        "generalValidationRules": [
            {
                "validationRuleSet": [
                    {
                        "rule": "Len(documentNumber)=7",
                        "error": "Length must be 7"
                    },
                    {
                        "rule": "Type(substr(documentNumber,1,2))"ALPHA",
                        "error": "Digits 1-2 must be alphabetic"
                    },
                    {
                        "rule": "Type(Substr(documentNumber,3,7))=NUMERIC",
                        "error": "Digits 3-7 must be numeric"
                    }
                ]
            }
        ],
        "dataSources": [
            {
                "type": "HRZ,
                "x": 0.728682839117049,
                "y": 0.914074196259178,
                "width": 0.23223571601752901,
                "height": 0.07002099950731461,
                "documentSide": "BACK",
                "font": "Arial Bold"
            }
        ]
    },
```

— 1200
— 1202
— 1204
— 1206
— 1208

⋮

Figure 12

EVALUATING THREE-DIMENSIONAL SECURITY FEATURES ON DOCUMENT IMAGES

CROSS-REFERENCE TO RELATED APPLICATIONS

The present application is a continuation-in-part of U.S. patent application Ser. No. 18/148,544, titled "Document Database," and filed on Dec. 30, 2022; a continuation-in-part of U.S. patent application Ser. No. 18/148,542, titled "Document Assembly Object Generation," and filed on Dec. 30, 2022; and a continuation-in-part of U.S. patent application Ser. No. 18/148,536, titled "Document Evaluation Based on Bounding Boxes," and filed on Dec. 30, 2022, the contents of which are hereby incorporated by reference in their entirety.

BACKGROUND

The present disclosure relates to document verification. More specifically, the present disclosure relates to confirming the authenticity of a document.

Documents are provided in many contexts. For example, documents may be provided in order to prove a person's age or identity, as is the case with identification documents, as proof ownership, as is the case with documents such as title documents, as proof of authenticity (e.g., a certificate of authenticity), as proof of address, etc. Those contexts may have significant, financial, legal, or safety implications.

SUMMARY

This specification relates to methods and systems for obtaining, using one or more processors, at least one image of a document under test, wherein valid instances of the document under test include at least one three-dimensional security feature; obtaining, using the one or more processors, a first image snippet from the document under test, the first image snippet corresponding to at least a first portion of the three-dimensional security feature present in the valid instances of the document; deriving, using the one or more processors, first dimensional data associated with the first image snippet; analyzing, using the one or more processors, the first dimensional data to determine one or more of: whether the first dimensional data is consistent with a presence of the three-dimensional security feature, and whether the first dimensional data is consistent with second dimensional data, wherein the second dimensional data corresponds to one of: a second portion of the three-dimensional security feature in the valid instances of the document and at least a portion of a second three-dimensional security feature in the valid instances of the document; and modifying, using one or more processors, a likelihood that the document under test is accepted as valid, or rejected as invalid, based on the analysis of the first dimensional data.

Other implementations of one or more of these aspects include corresponding systems, apparatus, and computer programs, configured to perform the actions of the methods, encoded on computer storage devices.

These and other implementations may each optionally include one or more of the following features. For instance, the features further include: obtaining a second image snippet from the image of the document under test; and deriving the second dimensional data associated with the second image snippet, wherein the three-dimensional security feature includes a set of tactile text, wherein the first dimensional data and first image snippet correspond to the first portion of the three-dimensional security feature by representing a first character in the set of tactile text, and wherein the second dimensional data and second image snippet correspond to the second portion of the three-dimensional security feature by representing a second character in the set of tactile text. For instance, the features further include deriving the first dimensional data by: determining, for each pixel in a set of pixels within the first image snippet, an intensity; assigning a first subset of pixels that satisfy an intensity threshold to a first color; assigning a second subset of pixels that fail to satisfy the intensity threshold to a second color; and generating, as the first dimensional data, the first and second color version of the first image snippet. For instance, the features further include determining whether the first dimensional data is consistent with the presence of the three-dimensional security feature includes: determining whether the first dimensional data is indicative of specular reflection; and responsive to determining that the first dimensional data is not indicative of specular reflection, determining that first dimensional data is inconsistent with the presence of the first three-dimensional security feature. For instance, deriving the first dimensional data by: identifying color variation within the first image snippet, wherein a color variation in portions of the three-dimensional security feature known to have a common color is determined to be indicative of three-dimensionality. For instance, deriving the first dimensional data includes: applying nearest neighbor with in-fill to the first image snippet. For instance, deriving the first dimensional data includes: generating a depth map from stereoscopic images of the document under test, the depth map indicating whether portion of the document under test associated with the first image snippet is three dimensional. For instance, the features further include determining whether the first dimensional data is consistent with the second dimensional data is based at least in part on the analysis determining a common light source. For instance, the features further include determining the common light source is based on one or more of specular reflection and ray tracing. For instance, the features further include determining whether the first dimensional data is consistent with second dimensional data is determined subsequent to determining that the first dimensional data is consistent with the presence of the three-dimensional security feature.

BRIEF DESCRIPTION OF THE DRAWINGS

The disclosure is illustrated by way of example, and not by way of limitation in the figures of the accompanying drawings in which like reference numerals are used to refer to similar elements.

FIG. 8 is an example document assembly object derived in part from a set of valid instances of a document and describing valid instances of the associated document in accordance with some implementations.

FIG. 12 illustrates an example document assembly object in accordance with some implementations.

DETAILED DESCRIPTION

The present disclosure is described in the context of an example document evaluator and use cases; however, those skilled in the art should recognize that the document evaluator may be applied to other environments and use cases without departing from the disclosure herein.

Documents are provided in many contexts. For example, documents may be provided in order to prove a person's age or identity, as is the case with identification documents, as proof ownership, as is the case with documents such as title documents, as proof of authenticity (e.g., a certificate of authenticity), etc. Those contexts may have significant, financial, legal, or safety implications. For example, documents may be provided to confirm an identity of a user prior to a financial transaction. If an invalid document is accepted and used for identification, identity theft, circumvention of sanctions, watchlists, or anti-money laundering mechanisms may occur.

Accordingly, it is desirable to verify a document, particularly before that document is relied upon. For example, before the document is relied upon as a reference for a comparison between an attribute (e.g., a biometric such as a signature, voice, face, retina, palm print, fingerprint, etc.) of a person present and the document.

A user wishing to establish his/her identity with an entity, e.g., a government agency or a commercial enterprise, may be asked to submit an image of a document through the entity's application on his/her mobile phone or through the entity's portal on a web browser. The entity may, depending on the implementation, may request verification of the document by the document evaluation systems and methods described herein.

Fraudsters may leverage technology to automate a series of repeated, fraudulent attempts to mislead an entity until a successful vector of attack is discovered, and their attacks may become increasingly more sophisticated (e.g., using photo editing software, such as Photoshop to modify images of valid documents to create fake/invalid documents, such as fake IDs). The document evaluator 226 described herein may beneficially detect such fraudulent documents.

Figure 1:
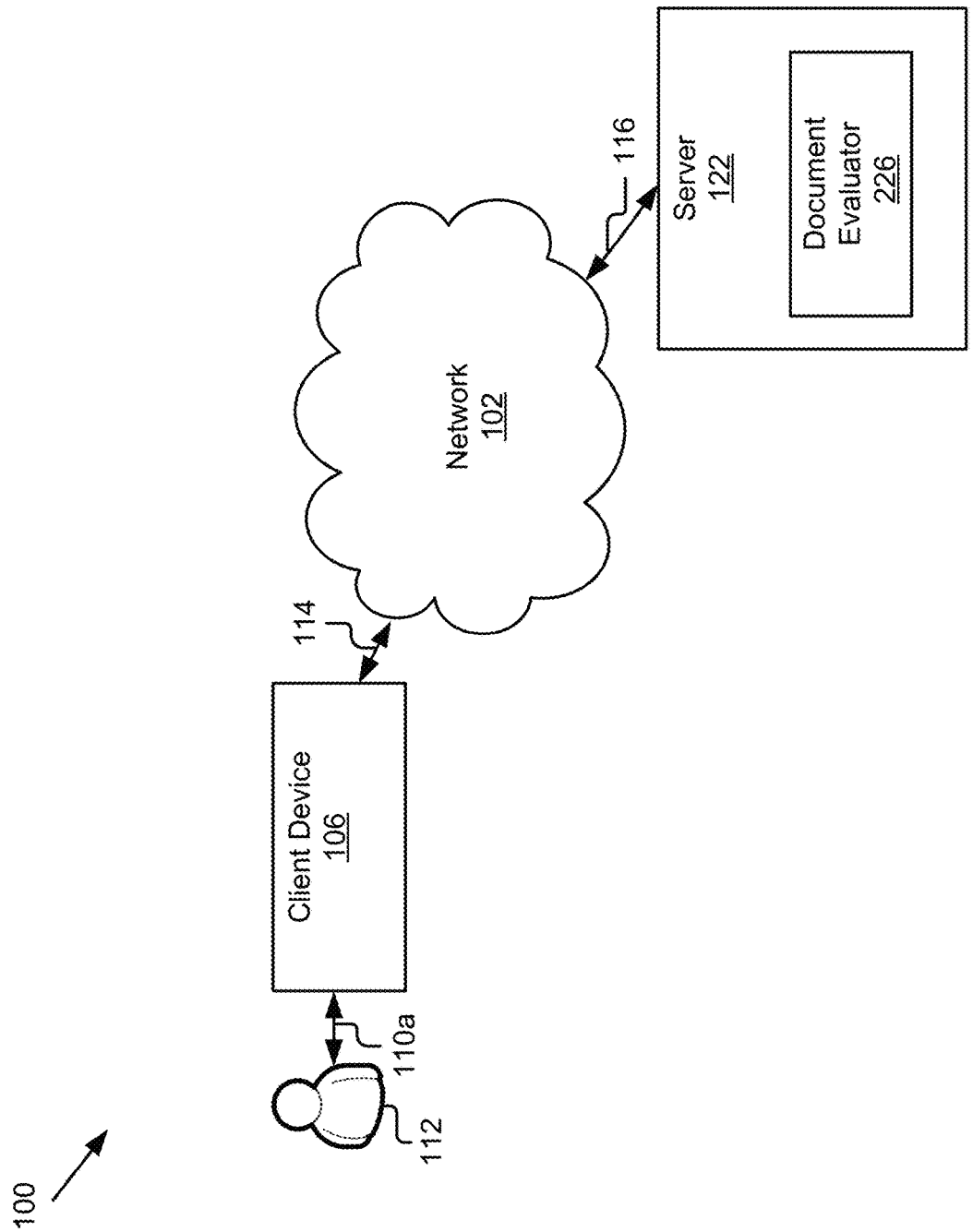
FIG. 1 is a block diagram of one example implementation of a system for document evaluation in accordance with some implementations.

FIG. 1 is a block diagram of an example system 100 for document evaluation in accordance with some implementations. As depicted, the system 100 includes a server 122 and a client device 106 coupled for electronic communication via a network 102.

The client device 106 is a computing device that includes a processor, a memory, and network communication capabilities (e.g., a communication unit). The client device 106 is coupled for electronic communication to the network 102 as illustrated by signal line 114. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc.

Although a single client device 106 is shown in FIG. 1, it should be understood that there may be any number of client devices 106. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of client devices 106, networks 102, or servers 122.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit). The server 122 may be communicatively coupled to the network 102, as indicated by signal line 116. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality described herein may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

For example, as depicted, the server 122 include an instance of the document evaluator 226. However, in some implementations, the components and functionality of the document evaluator 226 may be entirely client-side (e.g., at client device 106; not shown), entirely server side (i.e., at server 122, as shown), or divide among the client device 106 and server 122.

Figure 2:
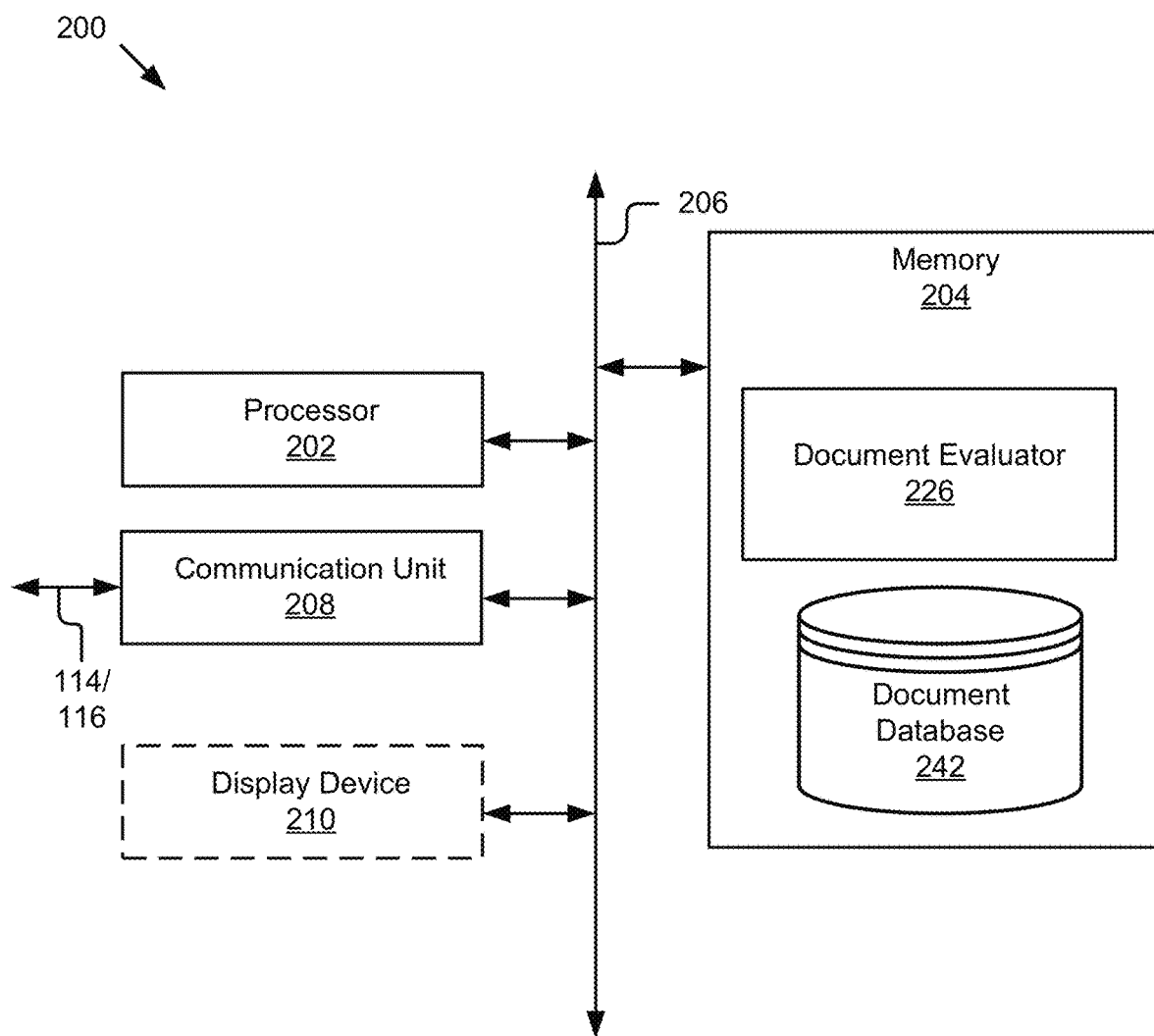
FIG. 2 is a block diagram of an example computing device in accordance with some implementations.

FIG. 2 is a block diagram of an example computing device 200 including an instance of the document evaluator 226. In the illustrated example, the computing device 200 includes a processor 202, a memory 204, a communication unit 208, an optional display device 210, and a data storage 214. In some implementations, the computing device 200 is a server 122, the memory 204 stores the document evaluator 226, and the communication unit 208 is communicatively coupled to the network 102 via signal line 116. In some implementations, the computing device 200 is a client device 106, which may occasionally be referred to herein as a user device, and the client device 106 optionally includes at least one sensor (not shown), and the communication unit 208 is communicatively coupled to the network 102 via signal line 114.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the document evaluator 226. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations. In some implementations, the memory 204 stores a document database 242. In some implementations, the document database 242 is stored on a portion of the memory 204 comprising a network accessible storage device.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display device 218 is a conventional type such as a liquid crystal display (LCD), light emitting diode (LED), touchscreen, or any other similarly equipped display device, screen, or monitor. The display 218 represents any device equipped to display electronic images and data as described herein. In some implementations, the display device 218 is optional and may be omitted.

It should be apparent to one skilled in the art that other processors, operating systems, inputs (e.g., keyboard, mouse, one or more sensors, etc.), outputs (e.g., a speaker, display, haptic motor, etc.), and physical configurations are possible and within the scope of the disclosure.

In some implementations, the document evaluator 226 provides the features and functionalities described below responsive to a request. For example, a request on behalf of an entity (not shown) to evaluate an image of a document. In some implementations, the evaluation of the document determines whether the document is accepted (e.g., determined to be valid) or rejected (e.g., invalid, abused, modified, fraudulent, etc.).

Figure 3:
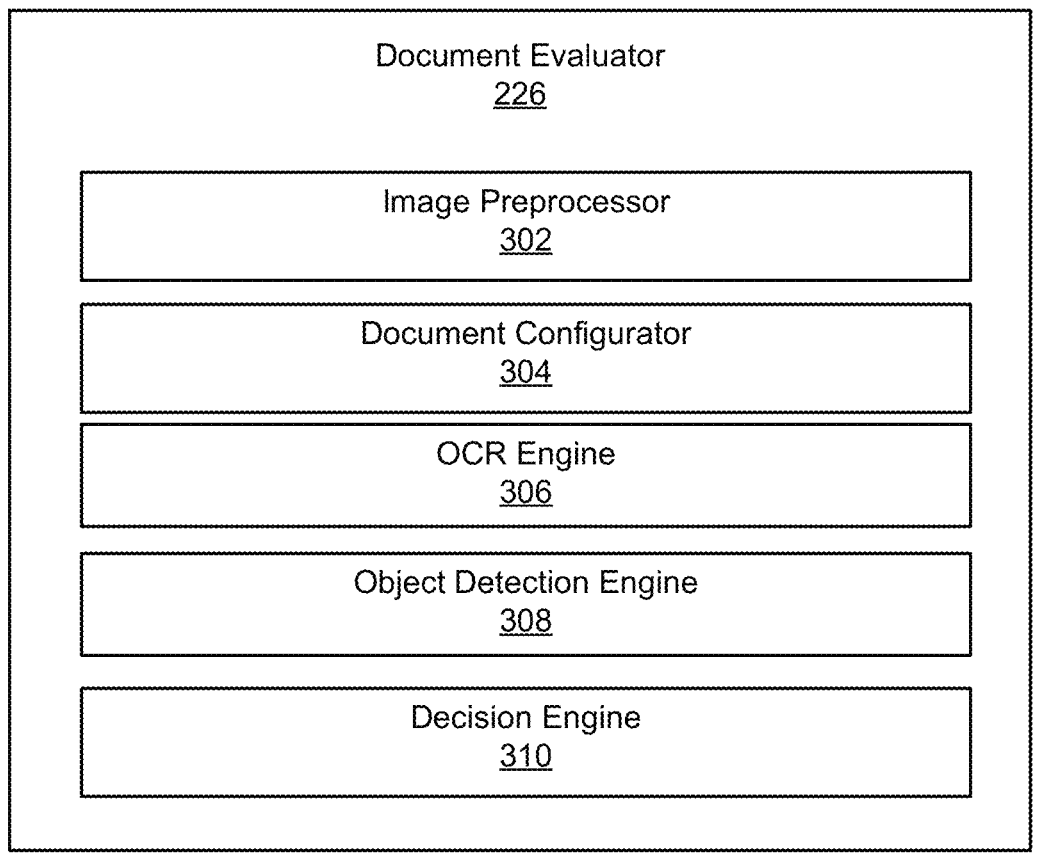
FIG. 3 is a block diagram of an example document evaluator in accordance with some implementations.

Referring now to FIG. 3, a block diagram of an example document evaluator 226 is illustrated in accordance with one implementation. As illustrated in FIG. 3, in some implementations, the document evaluator 226 may include an image preprocessor 302, a document configurator 304, an optical character recognition (OCR) engine 306, an object detection engine 308, and a decision engine 310. The components 302, 304, 306, 308, and 310, subcomponents, sub-subcomponents, etc. thereof are communicatively coupled to one another and/or to the document database 242 to perform the features and functionalities described herein.

In some implementations, the image preprocessor 302 receives one or more images representing a document, also referred to occasionally as an image of a document or document image and preprocesses the one or more document images to generate a set of post-processed images of the document for subsequent use by one or more of the other components of the document evaluator 226. The image preprocessor 302 is communicatively coupled to receive the one or more document images (e.g., from a camera sensor on the client device 106 via a web browser, mobile application, or API and the network 102).

The preprocessing performed by the image preprocessor 302, and accordingly the set of post-processed images generated, may vary depending on the implementation and use case. Examples of preprocessing performed by the image preprocessor 302 may include one or more of document extraction, rectification, composite image generation, edge detection, etc. In some implementations, the image preprocessor 302 may extract the portion of the image depicting the document (e.g., from the background or surrounding environment. In some implementations, the image preprocessor 302 may rectify the image data, or a portion thereof, by performing one or more of a rotation, a translation, and a de-skew. For example, in some implementations, the image preprocessor 302 determines the polygon associated with a document portion within the image and rotates and de-skews the polygon, e.g., to generate a normalized, rectangular representation of the document.

In some implementations, the image preprocessor 302 may receive multiple images of the same document instance (e.g., multiple frames from a video clip recording an identification document) and generate a composite image based on the multiple images. For example, some documents, such as government issued identification documents, may have optically dynamic security features such as color shifting ink, hologram, kinegrams, etc., which may not be represented in a single image. In some implementations, the image preprocessor 302 may make a composite document image that represents the optically dynamic security feature, when present, so that the document evaluator 226 may use those optically dynamic security features, or their absence, in the evaluation Some documents may have three-dimensional security features such as tactile text, tactile images, seals, emblems, laser or punch perforations, etc. For clarity and convenience, the description herein frequently refers to tactile text as an example of a three-dimensional security feature. However, other three-dimensional security features are identified herein and other three-dimensional security features exist. Additionally, the description herein regarding tactile text may be applied to detect, analyze, and use other three-dimensional security features to determine document authenticity or tampering without departing from the description herein, e.g., laser or punch perforations, etc.

The tactile text may be raised (e.g., concave, as may be the case with embossed characters, braille, etc.), recessed (e.g., convex, as may be the case with intaglio printing or laser perforations), or a combination thereof depending on the document. In some implementations, the image preprocessor 302 may make a composite document image that represents the portion(s) of the document expected to include tactile text, so that the document evaluator 226 may use the tactile text security features, or their absence, in the evaluation. For example, in some implementations, documents may include three-dimensional security features and the image preprocessor 302 may make a depth map based on a composite document image, e.g., by overlaying stereoscopic images of the document. In some implementations, the stereoscopic images are two or more images of a document instance taken from different angles. Depending on the implementation, the user may be explicitly prompted to take the two or more images (e.g., from the left and from the right) or the two or more images may be extracted, e.g., from a video of the document.

In some implementations, the image preprocessor 302 may perform other image processing on a document image or snippets thereof. For example, in some implementations, the image preprocessor may perform portions of the image processing described below with reference to FIG. 13 and the 3D presence evaluator 1346 and 3D consistency evaluator.

In some implementations, the image preprocessor 302 may perform edge detection. For example, such as government issued identification documents, may include a watermark which may not be captured under normal conditions (e.g., because the user's client device 106 and associated camera does not have/use a UV light source, backlighting with sufficient light to show a watermark is problematic for a user to capture, etc.). In some implementations, the image preprocessor 302 may perform an edge detection, such as a Canny edge detection to identify edges associated with a border of a watermark. In some implementations, the edge detection may be used, or applied, by the object detection engine 308 to detect missing or partially occluded security features, e.g., microprint, hologram, ghost image, watermark, etc.

In some implementations, a subset of the preprocessing performed by the image preprocessor 302 may be conditional based on a classification of the document. For example, in some implementations, the image preprocessor may extract the document portion and perform rectification for a document image. A document classifier may identify the document (e.g., a CA Driver's License issued in 2022), and the image preprocessor 302 may perform edge detection and/or composite image generation based on whether valid instances of that document class include a watermark or optically dynamic security feature and/or tactile text.

In some implementations, the set of post-processed document images includes one or more of a rectified image, a composite document image, and an output of an edge detection. In some implementations, the image preprocessor 302 communicates the set of one or more post-processed images to, or stores (e.g., in the document database 242), the set of post processed document images for retrieval by one or more of the document configurator 304, the object detection engine 308, and the decision engine 310. In some implementations, the features and functionalities of one or more of the document configurator 304, the object detection engine 308, and the decision engine 310 described below with reference a valid sample, or image under test, or document image, are on post-processed version(s) of the referenced document image (e.g., valid/invalid sample image or image of the document under test).

The document configurator 304 generates a document assembly object describing a valid document. In some implementations, the document assembly object describing a valid document is used by the decision engine 310, described further below, to at least partially determine whether a document under test is valid. In some implementations, the document configurator 304, by generating the document assembly object describing a particular valid document, adds support for a new document, where the new document may be a newly issued document (e.g., new driver's license) or a previously unsupported document (e.g., an identification document not previously supported by the document evaluator 226 and/or its decision engine 310).

It should be recognized that for artificial intelligence/machine learning many instances (e.g., hundreds or thousands) are needed to train a reliably accurate model. In cases such as a newly issued document (e.g., a new driver's license), this poses a challenge sometimes referred to as the "cold start problem," i.e., there is not enough data (e.g., valid and/or invalid instances of that document) to begin training a reliable model. Additionally, when sufficient data is available, it may take weeks or months to train, validate, and optimize an AI/ML model. This delay may result in suboptimal outcomes such as not supporting the document, which may anger and frustrate users or customers, as their valid documents cannot be used and they may not have an alternative, supported document available.

In some implementations, the document evaluator 226, by using a document assembly object generated by the document configurator 304 using as few as three valid samples in some implementations, may quickly support and process a new document, thereby reducing or eliminating the cold start problem and substantially shortening the time to add support of a new document. In some implementations, the number of valid samples may be subsequently or iteratively supplemented, e.g., to better account for variations in the document issuer's printing equipment, (e.g., standard deviations in alignment and/or spacing).

Figure 5:
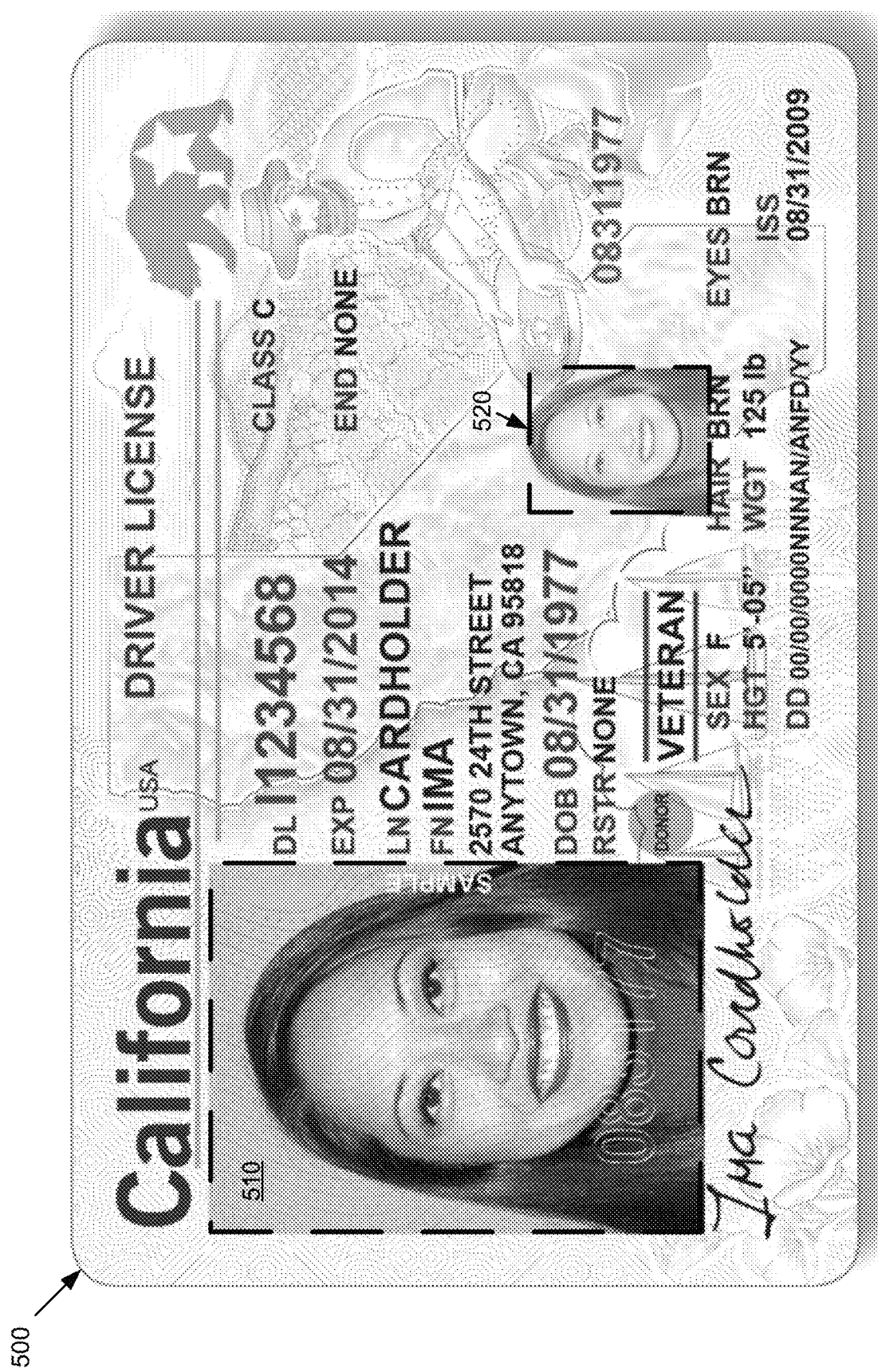
FIG. 5 is an image of an example of a California Driver's License, which is an example document in accordance with some implementations.

For clarity and convenience, the description herein makes repeated reference to documents that are government issued identification documents, such as ID cards, voter cards, passports, driver's licenses, visas, etc., and more particularly to an example California Driver's License (CADL) 500 depicted in FIG. 5, sometimes referred to herein as the CADL example. However, it should be recognized that other documents exist and may be supported by the system 100. For example, financial documents (e.g., check, bearer bonds, stock certificates, bills, etc.) or other documents may be supported and evaluated by the system 100.

Figure 4:
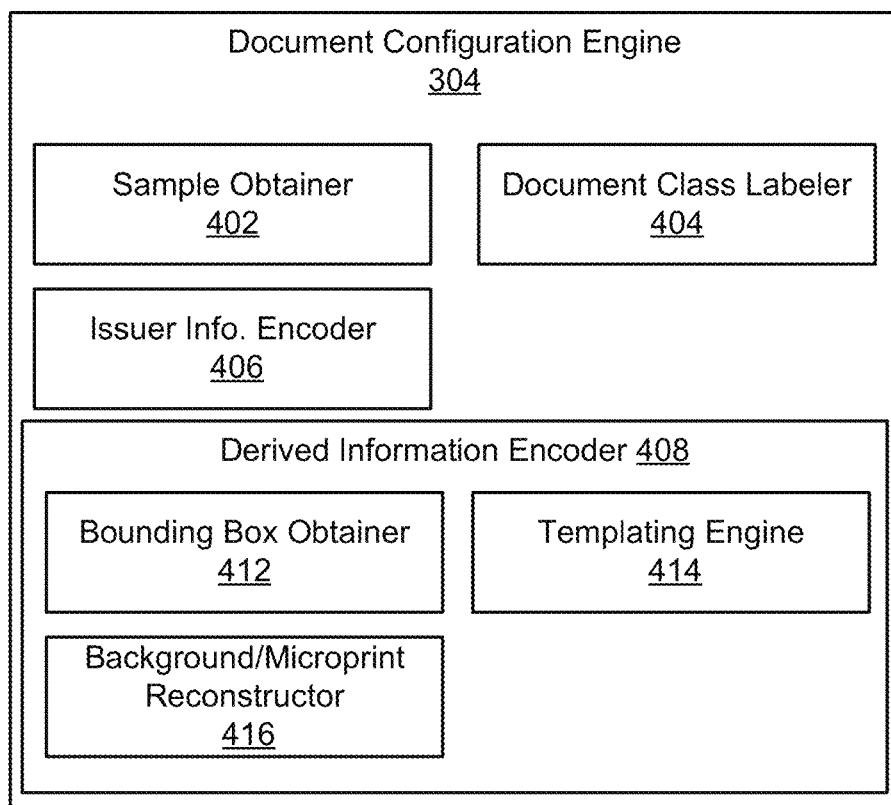
FIG. 4 is a block diagram of an example document configuration engine in accordance with some implementations.

Referring now to FIG. 4, a block diagram of an example document configurator 304 is illustrated in accordance with some implementations. As illustrated in FIG. 4, the document configurator 304 includes a sample obtainer 402, a document class labeler 404, an issuer information encoder 406, and a derived information encoder 408.

The sample obtainer 402 obtains a set of one or more valid samples of a document, where a valid sample includes an image of a valid instance of a document. For example, a valid sample may be an example published by the document's issuer or other verified document instances. Referring now to FIG. 5 an image of an example of a CADL 500 published by its issuer, the California Department of Motor Vehicles (DMV) is illustrated. The illustrated example, despite indicating an issue date of "08/31/2009" is an example of a CADL that started being issued Jan. 22, 2018. Referring to FIG. 5, in some implementations, the sample obtainer 402 may obtain the illustrated CADL 500, e.g., directly from the issuer's website or other electronic publication, as a valid sample.

An issuer's electronic publication is merely one example of a potential source of one or more valid samples. Valid samples may be obtained from different or additional sources depending on the implementation and use case. For example, in some implementations, a valid sample or set of valid samples may be obtained from a manual/human review (e.g., in the case of a newly issued ID) and/or from the decision engine 310 (e.g., as more instances of the document are processed and valid instances are determined by the decision engine 310). In some implementations, the image of a valid instance of a document may be a post-processed image of a valid instance of that document obtained via the image preprocessor 302.

Referring again to FIG. 4, the document class labeler 404 obtains a set of labels describing the document and associates the set of labels with the document assembly object describing a particular (e.g., a new) valid document, which is being generated by the document configurator 304.

In some implementations, the document class labeler 404 may obtain labels describing one or more of the document and the document's issuer. For example, in some implementations, the document class labeler 404 may obtain labels describing one or more of a document type (e.g., ID card, passport, driver's license, or visa), a country code (e.g., associated with the issuer, such as US for the CA Driver's License), a subtype (e.g., national ID, resident permit, work permit, voter card, driver's license in the case of the CADL example, etc.), an edition (e.g., a resident permit may have citizen and non-citizen versions, a driver's license may have commercial or regular editions instead of different endorsements, or an ID may have different versions for an adult and a minor, etc.), a state (e.g., CA in the case of the CADL example), a time of first issuance of the document (e.g., Jan. 22, 2018 or just the year 2018 in the CADL example, depending on the implementation), and a tag (e.g., a version number if multiple versions are released in the same year). In some implementations, document class labeler 404 may associate, or assign, a document identifier, e.g., a unique number assigned sequentially, to the document assembly object. In some implementations, the document class labeler 404 may receive a parent identifier, where the parent identifier identifies a parent document, and the "child" may inherit at least a portion of the document assembly object.

In some implementations, the document class labeler 404 obtains one or more labels based on user input. For example, in some implementations, the document class labeler 404 presents a user interface and a user selects one or more of the document identifier, a parent identifier, the type (e.g., ID type), the country code, subtype, state, year, tag, etc. via the user interface (e.g., via selection in a drop down menu or entry into a field). In some implementations, the document class labeler 404 obtains one or more labels based a source of a valid document sample. For example, the document class labeler 404 obtains the labels DL_US_REGULAR-DL_CA_2018_0 for the CADL example when the valid sample is obtained from the CA Department of Motor Vehicles, which issues driver's licenses in the US state of California, and the CADL example began issuing in 2018 and was the only version issued that year.

In some implementations, the set of labels is consistent with an output of a document classifier. For example, during production, when the document evaluator 226 receives an image of a document under test, the decision engine 310 may, in some implementations, use a document classifier 1302, described below in FIG. 13, to identify the class of the document under test. In some implementations, that identified class is represented by a document class label, and that document class label may be used by the decision engine 310 to obtain a document assembly object associated with the corresponding label. For example, in some implementations, the document classifier may output a class including a concatenation of labels, such as DL_US_REGULAR-DL_CA_2018_0 (i.e., ID type, country, subtype, state, year, tag), which may uniquely identify a document assembly object describing valid instance of the document being evaluated under test. It should be recognized that the preceding is merely an example of an output class and the labels and order of those labels comprising the output class may vary based on the document and implementation.

The issuer information encoder 406 obtains information provided by a document issuer and encodes the issuer provided information into the document assembly object. In some implementations, the issuer provided information encoded into the document assembly object includes one or more of a set of document components and a set of direct checks. Examples of document components may include, but are not limited to, whether a photograph is present (e.g., in the case of a photo ID), fields (e.g., first name, last name, address, gender, date of birth, issue date, expiry date, ID number, endorsements, restrictions, class, etc.), field labels (e.g. "HGT" for height, "WGT" for weight, etc.), what fields are optional and mandatory, what the available options are (e.g., the available set of abbreviations used for eye color, hair color, sex, etc.), the security features (e.g., presence of tactile text, a watermark or optically dynamic security feature such as a hologram or kinegram), etc.

Examples of direct checks may include but are not limited to checking the presence, or absence, of issuer-specified-mandatory components (e.g., field(s) and or security feature(s), such as laser perforations); checking an issuer prescribed rule, e.g., to ensure that a driver's license number has one or more of a valid format, composition, length, or falls within a range specified by the issuer; etc.

In some implementations, the issuer information encoder 406 may automatically obtain and/or encode the issuer provided information. For example, in some implementations, the issuer information encoder 406 may crawl issuer websites (e.g., including the CA DMV's website) for an electronic publication of new document and associated technical documentation, parse technical documentation and encode the set of document components and direct checks extracted therefrom.

The derived information encoder 408 derives information describing valid instances based on one or more valid sample images (e.g., post-processing) and encodes the derived information into the document assembly object. In some implementations, the derived information encoded into the document assembly object includes one or more of a set of document features and a set of derived checks.

In some implementations, derived information may refer to information not explicitly provided by an issuer in technical documentation. In some implementations, the derived information and/or derived security checks may be initially based on valid instances and be modified or supplemented based on fraudulent samples. In some implementations, the combination of the direct checks and indirect checks in combination may determine if any security feature has been violated in any way.

In some implementations, the derived information encoder 408 includes a bounding box obtainer 412, a templating engine 414, and a background/microprint reconstructor 416. The bounding box obtainer 412 receives information regarding the one or more bounding boxes generate by one or more of the optical character recognition (OCR) engine 306 and the object detection engine 308.

Referring to FIG. 3, it should be understood that, while text/characters may be detectable objects, this description generally refers separately to the detection of text and textual characters with reference to the OCR engine 306 and other objects (e.g., holograms, seals, watermarks, laser perforations, etc., which if present, absent, or occluded may indicate tampering) with reference to the object detection engine 308 for clarity and convenience. Depending on the implementation, only textual characters, only other objects, or a combination of textual characters and other objects may be bound in box(es) and used to evaluate a document. It should further be understood that the use of bounding boxes may reduce the area of the document being processed to the area(s) likely to be tampered with, thereby reducing the amount of processing without, or with minimal, loss in accuracy.

It should be understood that, while a single OCR engine 306 and a single object detection engine 308 are illustrated in FIG. 3, different implementations may use one or more OCR engines 306 and/or one or more object detectors 308. For example, in some implementations, the OCR engine 306 represents a bank of multiple OCR engines with different detection qualities. As another example, in some implementations, the object detection engine 308 includes multiple different object detectors, (e.g., a first object detector for detecting holes such as a punch or laser perforation, a second object detector for detecting a facial image in a photo ID, etc.)

The document evaluator 226 includes one or more of an OCR engine 306 and an object detection engine 308 according to some implementations. In some implementations, the OCR engine 306 and/or the object detection engine 308 are executed, at the request of the document configurator 304, during configuration and provide at least a subset of derived information describing valid instances of a document (e.g., CADL 500 as a valid CADL example shown in FIG. 5), which the derived information encoder 408 encodes into the document assembly object associates with that class of document. In some implementations, the OCR engine 306 and/or object detection engine 308 are executed at the request of the decision engine 310 during production and provide information derived from the image of the document under test (e.g., the post-processed image of the document under test) for comparison, by the decision engine 310, to the document assembly object associated with that class of document.

The OCR engine 306 converts text in an image into machine-readable text. In some implementations, when the OCR engine 306 executes, the presence of text is recognized in the input image (e.g., a valid sample during configuration or a document under test image during production) and bounding boxes are generated around that text. In some implementations, derived information describing these bounding boxes, which enclose text in the input image, are made accessible to one or more of the document configurator 304 (e.g., when the document image is of a valid sample) and the decision engine 310 (e.g., when the document image is of a document under test). In some implementations, the OCR engine 306 derives information describing one or more of a size, position, orientation (e.g., horizontal or vertical), and textual content of each bounding box. For example, the size and position of the bounding box around the DL number could be represented by a set of coordinates associated with the four vertices of the bounding box and the content could be represented as "11234568."

It should be understood that other representations are within the scope of this description (e.g., center, width, and height of the bounding box instead of the vertices/corners, the description of the content may include other or additional information than the text, such as font characteristics including one or more of a font such as "Arial", font size such as 10 pt., font style such as bold, capitalization such as use of all caps or small caps, etc.), dimensionality (e.g., flat or tactile nature of the text). It should further be understood that, while the description herein refers to bounding boxes that are quadrilateral with four vertices, a bound box may be any shape with any number of vertices.

Figure 6:
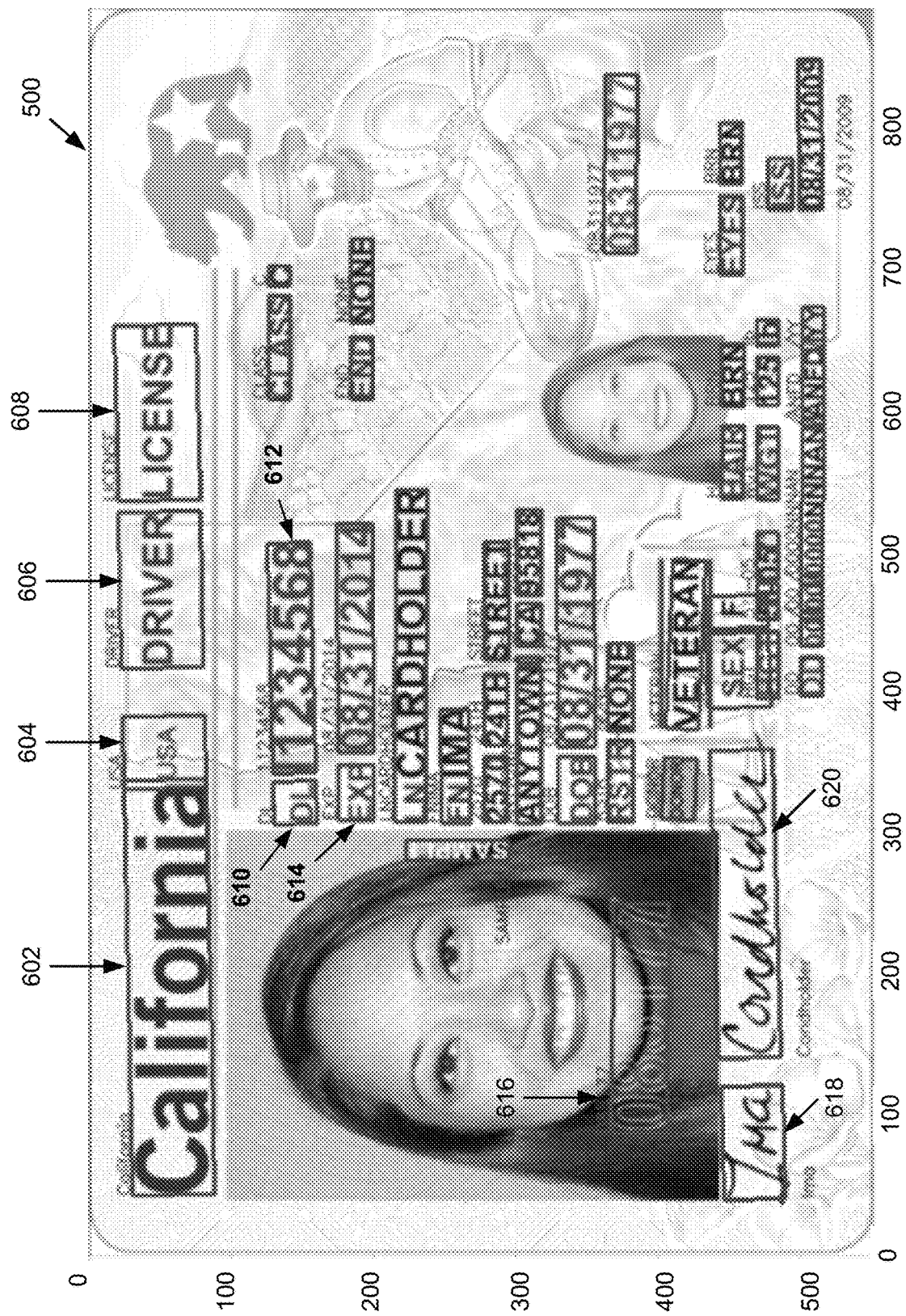
FIG. 6 is an image of the example California Driver's License with examples of bounding boxes superimposed in accordance with some implementations.
Figure 7:
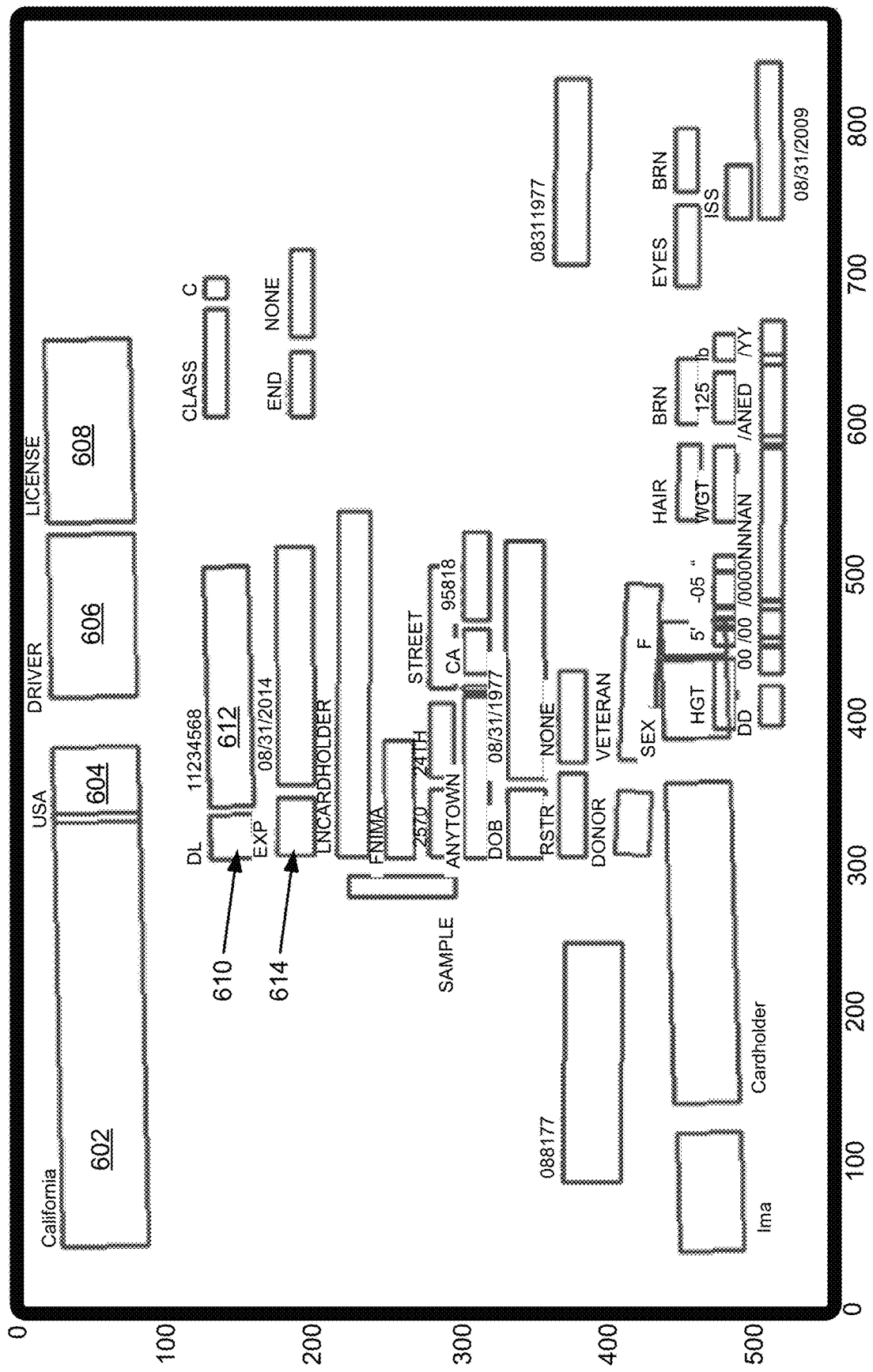
FIG. 7 is an example illustration of the bounding boxes without the example California Driver's License in accordance with some implementations.

Referring to FIG. 6, an example illustrating the CADL 500 of FIG. 5 with bounding boxes, with examples of bounding boxes superimposed in accordance with some implementations. In some implementations, the OCR engine 306 generates the illustrated bounding boxes including bounding boxes 602, 604, 606, 608, 610, 612, 614, 616, 618, and 620. Referring to FIG. 7, an example illustration of the bounding boxes shown in FIG. 6, but illustrated without the background of the CADL 500 example of FIG. 5, is shown in accordance with some implementations. Referring to FIG. 8, an example of derived information describing a subset of the bounding boxes illustrated in FIGS. 6 and 7, which may be generated by the OCR engine 306 in accordance with some implementations. For example, portion 802 describes the bounding box 602 in shown in FIGS. 6 and 7. In the illustrated implementation, portion 802 textually describes the textual content (i.e., "'description': 'California'") and the size and position of the polygon associated with the bounding box (i.e., the x and y coordinates of the four vertices, where the x and y axis and associated labels may be seen in FIGS. 6 and 7). Similarly, portion 804 describes bounding box 604 in FIGS. 6 and 7, portion 806 describes bounding box 606, and so on. It should be understood that, while portions 802-814 corresponding to 602-614 are illustrated as examples in FIG. 8, additional portions (not shown) describing the other bounding boxes of FIGS. 6 and 7 may be generated but are not shown for the sake of brevity and conciseness.

Referring to FIG. 3, the object detection engine 308 detects one or more objects in a document image. In some implementations, when the OCR engine 306 executes, the presence of an object is recognized in the input image (e.g., a valid sample during configuration or a document under test image during production) and bounding box(es) are generated around the object(s). Examples of object may include one or more of a hole punched in the document (often indicating that the document is expired or invalid), the overall shape of the document (e.g., a clipped bottom right corner may be used by the system 100 to quickly determine invalidity for certain jurisdictions/issuers), signatures, facial images, ghost images, holograms, watermarks, kinegrams, seals, symbols, laser perforations, etc. For example, referring to FIG. 5, in some implementations, the object detection engine 308 may detect the facial image 510 and ghost image 520, and generate derived information describing the bounding boxes associated with detected objects. For example, the object detection engine 308 may generate bounding boxes such as those illustrated in FIG. 5 around the images 510 and 520 and may generate derived information (not shown) analogous that in FIG. 8 but describing the detected objects in the image and associated bounding boxes 510 and 520.

In some implementations the derived information includes a description of the content, size, and position of the generated bounding box(es), e.g., as illustrated in FIG. 8. In some implementations, the derived information, generated by the OCR engine 306 and/or the object detection engine 308 includes one or more snippets based on the generated bounding boxes. For example, in some implementations, the bounding boxes are used to crop the (e.g., post-processed) image of the document and generate a snippet of the associated text or object contained therein.

Figure 9:
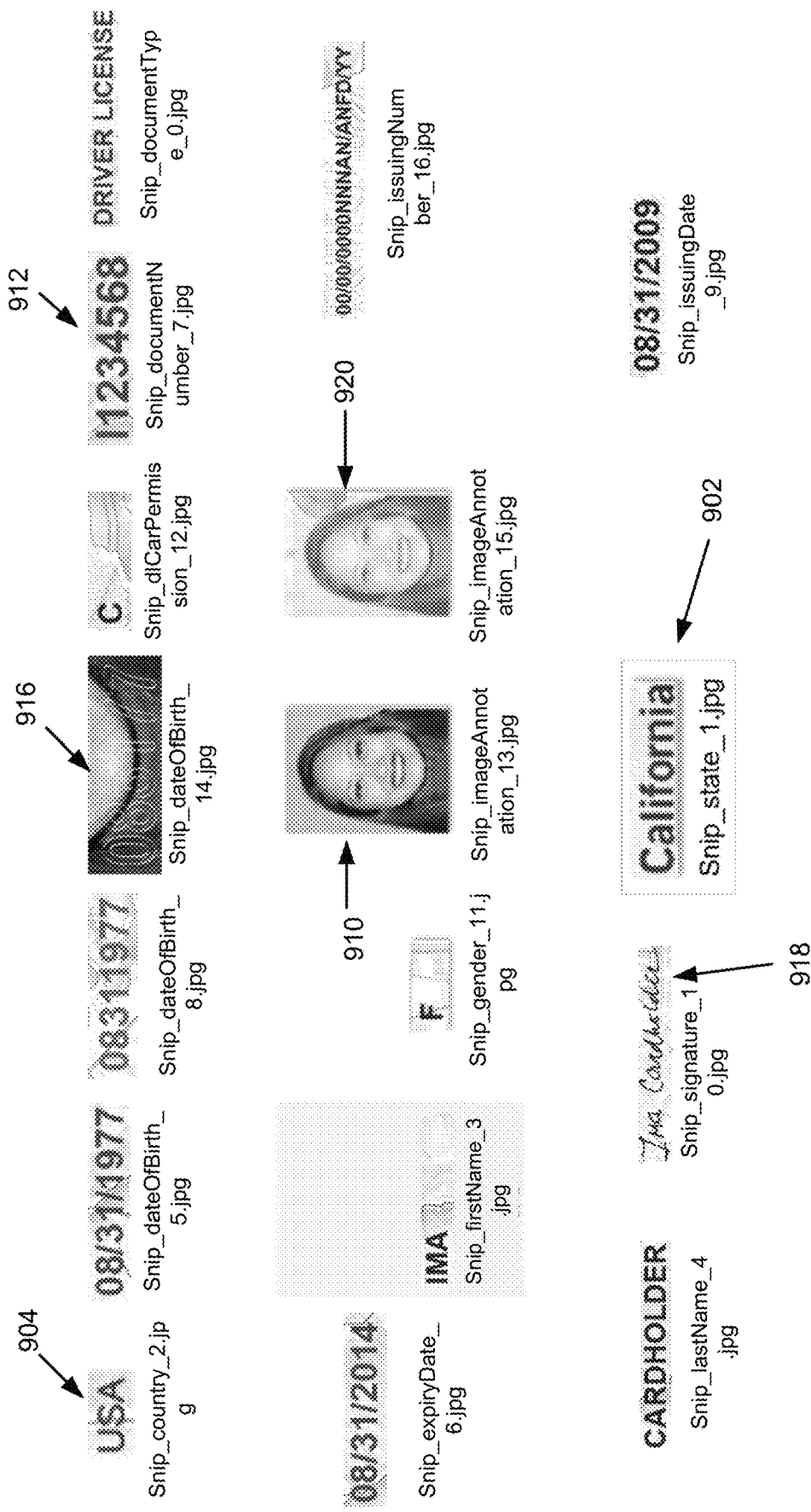
FIG. 9 illustrates example snippets derived from the example California Driver's License (CADL) in accordance with some implementations.

Referring to FIG. 9, examples of snippets are illustrated in accordance with some implementations. In FIG. 9, snippet 902 corresponds to the portion of the CADL 500 in bounding box 602 as illustrated in FIG. 6, snippet 904 corresponds to the portion of the CADL 500 in bounding box 604 as illustrated in FIG. 6, snippet 912 corresponds to the portion of the CADL 500 in bounding box 612 as illustrated in FIG. 6, snippet 910 corresponds to the portion of the CADL 500 in bounding box 510 as illustrated in FIG. 5, snippet 916 corresponds to the portion of the CADL 500 in bounding box 616, snippet 918 corresponds to the card holders signature (which were two, distinct bounding boxes 618 and 620 in FIG. 6 for the first and last name, but may be treated as a signature unit in a single bounding box and snippet 918 as illustrated in FIG. 9), and snippet 920 corresponds to the portion of the CADL 500 in bounding box 520 as illustrated in FIG. 5. FIG. 9 illustrates other snippets associated with other content visible within other bounding boxes illustrated in FIG. 6 but may not be referenced or described herein for the sake of brevity and conciseness.

Referring FIG. 4, the illustrated derived information encoder 408 includes a bounding box obtainer 412 which is communicatively coupled to receive or retrieve the derived information generated by the OCR engine 306 and/or the object detection engine 308.

The templating engine 414 may generate a template based on the derived information from one or more valid instance of the document. In some implementations, the templating engine 414 generates a bounding box template describing valid instances of the document, which may be included in the document assembly object for that document. In some implementations, the templating engine 414 label obtained bounding boxes based on different types of content. For example, referring to FIG. 10, an example of a template generated by the templating engine 414 is illustrated in accordance with some implementations. In the illustrated example, the template is shown overlayed on the CADL 500.

In some implementations, the templating engine 414 determines a set of template bounding boxes based on the bounding boxes generated from the valid samples. For example, in FIG. 10, a set of bounding boxes is illustrated and includes bounding boxes 1010, 1012, 1014, 1032 and others not identified with a reference number. In some implementations, the template bounding boxes may be based sized and positioned such that a template bounding box would cover the associated text or object in all instances of the valid samples. For example, the bounding box 1032 is wider than necessary to contain the first name "IMA," but a second valid instance may have had a much longer first name, so the width of the template bounding box 1032 is larger based on that. In some implementations, the templating engine 414 may label bounding boxes within the bounding box template. For example, bounding box 1010 may be labeled as a "field prefix" and bounding box 1012 may be labeled as a "field."

Figure 10:
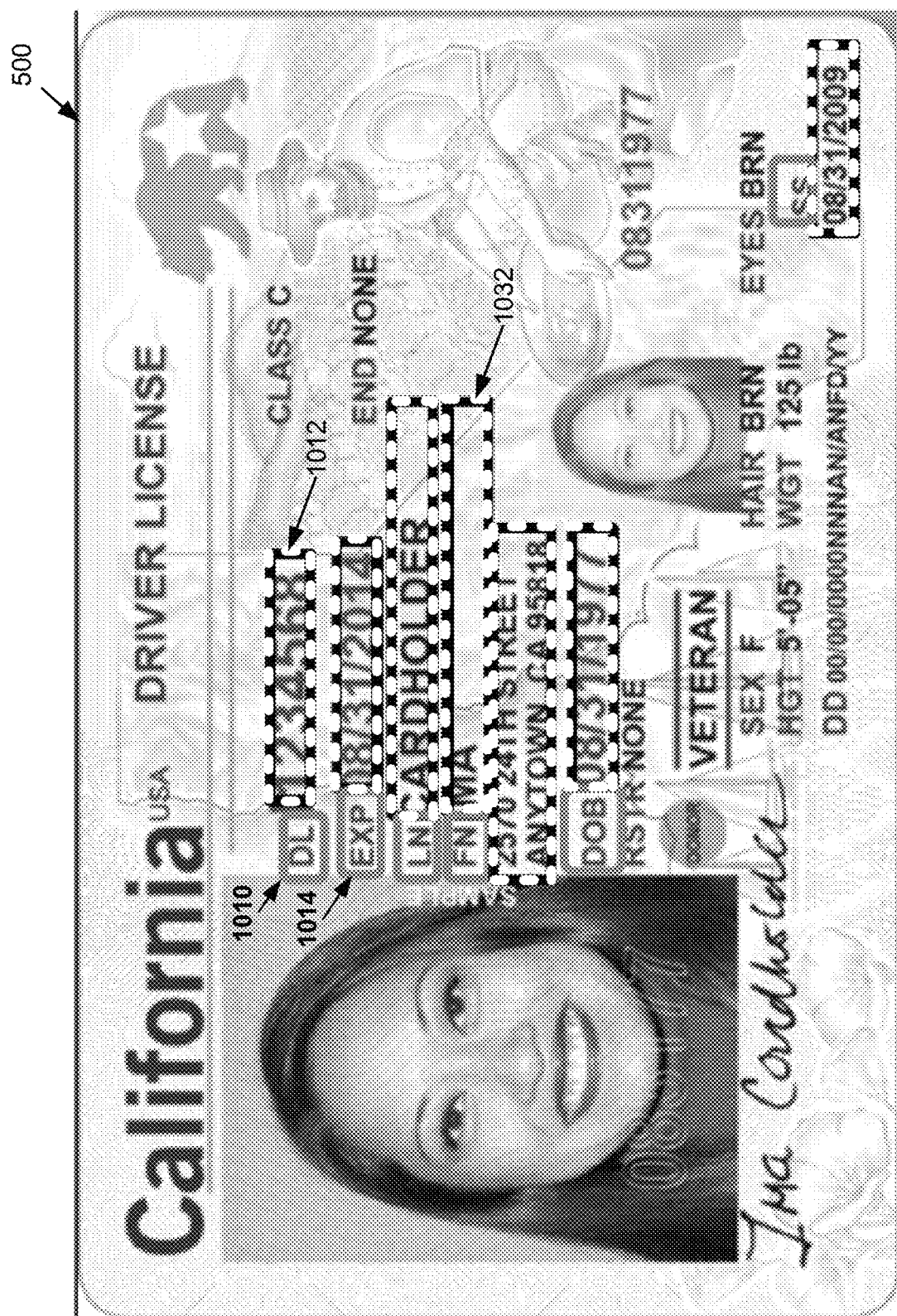
FIG. 10 illustrate an example representation of a bounding box template included in a document assembly object in accordance with some implementations.

It should be understood that the bounding box template of FIG. 10 and the labels described herein are merely examples and may be modified without departing from the description herein. For example, while FIG. 10 illustrates bounding boxes associated with text fields and their prefixes, the template may include bounding boxes (not shown) associated with one or more objects, such as the facial image 510, the ghost image 520, the gold star bear in the top-right corner, etc. As another example, the illustrated template of FIG. 10 only includes a subset of potential bounding boxes that may comprise the template. For instance, the bounding boxes may include a field prefix bounding box (not shown) for the "SEX" field prefix and a field bounding box for the associated "F" or "M" (not shown). As another example, the cardholder's signature below the facial image may be associated with a bounding box (not shown) to allow one or more of (1) a determination as to whether the signature is raised as would be expected in a valid instance and (2) a comparison to a signature on the back of the card (not shown) and/or to computer-generated fonts, e.g., Lucidia Console, posing as human written text/signature. As yet another example, the DOB printed over the facial image (i.e., 083177 in example CADL 500) may be associated with a bounding box (not shown) to determine whether that text is tactile text, which may be characteristic of a valid CADL instance.

In some implementations, the templating engine 414 may determine other derived information for the template. For example, the templating engine 414 may determine characteristics of the font associated with each bounding box (e.g., each field prefix and field) in the document and include that in the template. In some implementations, the characteristics of the font may include dimensionality, such as whether the text is tactile. In some implementations, the templating engine 414 may determine background/microprint information for each of the bounding boxes in the template. For example, in some implementations, the templating background may obtain snippets associated with a template bounding box from a reconstructed background/microprint generated by the background/microprint reconstructor 416.

The background/microprint reconstructor 416 generates a background and/or reprint associated with the one or more valid instances of a document. In some implementations, the background/microprint reconstructor 416 extracts the text and objects present in an image (e.g., post-processing) of a valid document to obtain the microprint and/or background. For example, in the CADL 500 of FIG. 5, the microprint background includes flowers in the bottom left corner, the man panning for gold on the right side with a dotted outline of a bear and the outline of the state of California superimposed, sail boats in the bottom-center, mountains in the top-center, a depiction of the outline of the state of California in the center, some clouds in the top-right corner, a lot of fine, visual texture (e.g., swirls, fine lines, shadows reminiscent of topography, patterns, etc.) throughout the document.

Figure 11:
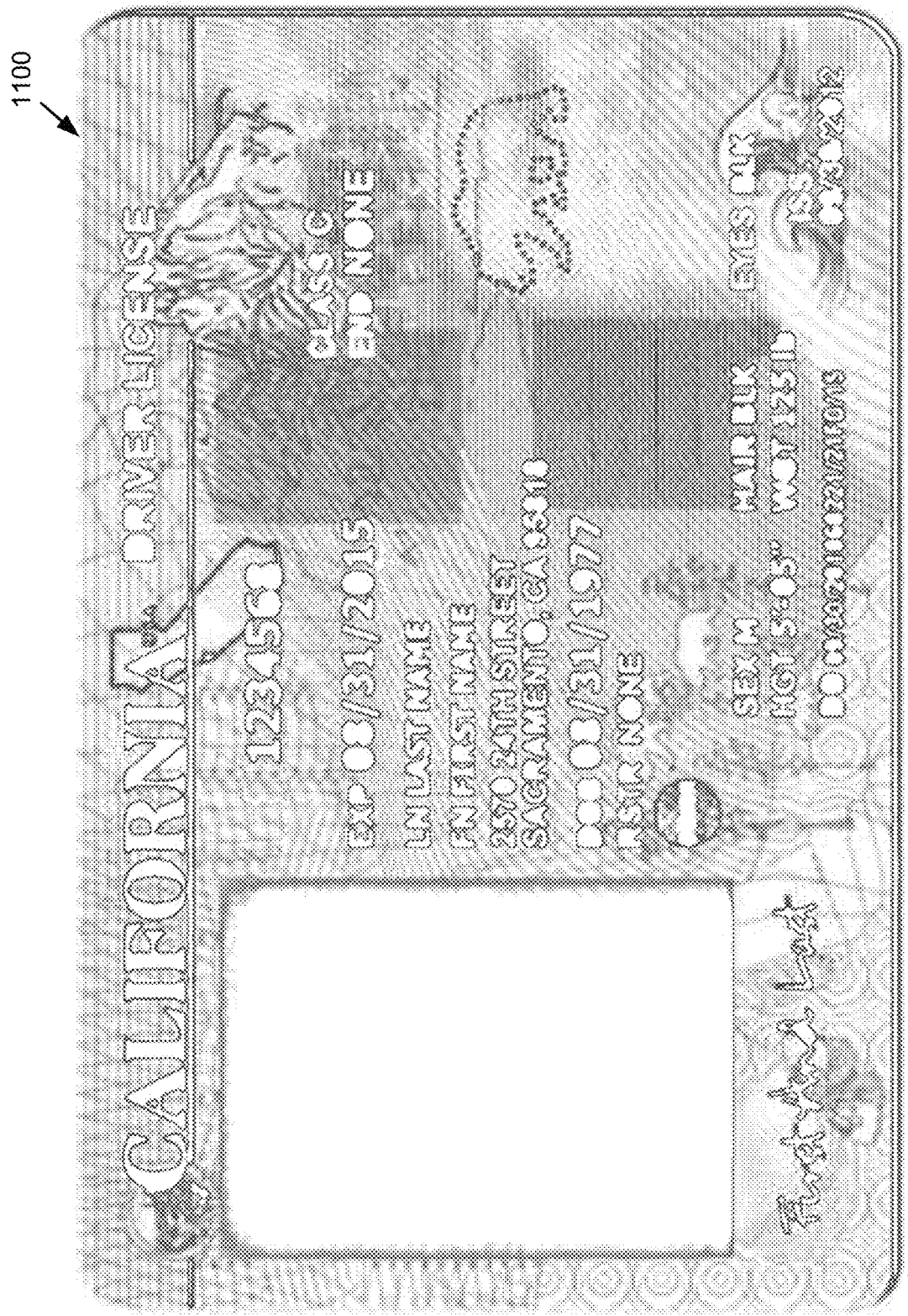
FIG. 11 illustrates an example of microprint from a valid instance of another example CADL in accordance with some implementations.

As another example, referring to FIG. 11, an example of a microprint background 1100 obtained from a first instance of a CA Driver's License, which is a different version from the CADL 500 illustrated in FIGS. 5, 6 and 10. In some implementations, the background/microprint reconstructor 416 obtains the microprint background 110 from a first valid sample, obtains one or more other microprint backgrounds (not shown) from other valid instances of the same document class, and combines the microprint backgrounds to reconstruct the microprint/background of the document. For example, if a first instance includes an "O" or a "0" and the second instance includes an "I" or a "1" in the same position, since there is little overlap between the portions obscured by those two instances, the background/microprint reconstructor 416 may be able to reconstruct most of the background/microprint in that area, thereby reconstructing a representation of the microprint or background without obstructions by text and/or objects. By using all 10 numerals and 26 characters in the English language, nearly all the occluded portions may be reconstructed. While the disclosure herein refers to the English alphabet and Arabic numerals, the application to one or more other numerical and alphabetical systems, including, but not limited to, Greek, Cyrillic, Kanji, Arabic, Hebrew, etc., is within the scope of this disclosure.

The document configurator 304 generates a document assembly object describing valid instances of a document. The contents of the document assembly object may vary in content depending on the document it describes (e.g., some documents may lack fields or security features, the direct and indirect validation checks may differ, as well as the relative positions of the fields and security features). However, in some implementations, the document assembly object has a common structure or framework across the document assembly object instances. In some implementations, the document assembly object is low code or no code. For example, a user provides the class labels using drop down menus and template and checks are automatically derived by the document evaluator 226 and its subcomponents from the valid samples and/or extracted from issuer information.

In some implementations, the document assembly object includes encoded issuer information (e.g., for US drivers licenses this may include mandatory fields, optional fields, images, security features, document layout, etc. as defined by the American Association of Motor Vehicles) and/or direct checks on that issuer information. In some implementations, includes derived information (e.g., bounding boxes associated with document fields and relative positions, fonts, font dimensionality, reconstructed microprint images, color information, etc.) and/or derived checks on the derived information (e.g., spacing between field prefix and field text, etc.). In some implementations, the document assembly object includes or is associated (e.g., via a link) with context information associated with the document represented by the document assembly object. Examples of context information may include, but are not limited to, IP addresses and/or locations (e.g., physical and/or network) and/or device information (e.g., associated with submissions of valid document under test images and/or invalid document under test images), a risk assessment associated with the document (e.g., a tier or metric, which may indicate a level of scrutiny or fraud risk, since some documents may be more frequently used in attempted fraud), etc. In some implementations, the context information is aggregated based on one or more requests including a document under test is that associated with the document represented by the document assembly object. For example, the context information includes information associated with the documents under test (e.g., IP addresses, snippets including facial image, device IDs, document numbers, etc.), which may be used by the decision engine 310 to evaluate the document (e.g., an IP address associated with a number of invalid attempts may increase the likelihood that a document under test received from the IP address is determined to be invalid and/or subjected to greater scrutiny). To summarize and simplify, in some implementations, the context information may be used to identify and neutralize repeated fraud attempts.

The document assembly object may vary in its data representation depending on the implementation. In some implementations, the document assembly object comprises a data object. For example, the document assembly object is a JavaScript Object Notation object. Referring to FIG. 12, an example portions of a document assembly object 1200 are illustrated in accordance with some implementations. In portion 1202, example class labels are represented. More specifically, the document type is indicated as an "ID_CARD," the country is "FRA" indicating France, the state is nonapplicable (i.e., "null") since the document is a national ID, the version, printed document name, and other properties are also included. In some implementations, portion 1202 may be generated by the document class labeler 404.

In portion 1204, an example description of the document number field is represented. More specifically, the expected data type (i.e., a string") length of the string (i.e., 0-60), etc. are defined in portion 1204. In portion 1206, some examples of direct checks related to the document number field are represented. For example, the document number must be 7 characters in length, the first two characters must be alphabetic and the third through seventh characters must be numeric. In some implementations, portions 1204 and 1206 may be generated by the issuer information encoder 406.

In portion 1208, an example of derived information associated with the document number field is represented. More specifically, portion 1208 identifies that the field is a human-readable zone (HRZ), as opposed to a machine-readable zone, such as a barcode or QR code. The position (i.e., x, y coordinates) and size (i.e., height and width) of the bounding box associated with the document number field, the side of the document on which the document number is found, and the font "Arial Bold" used for the document number, which may be compared to a detected font in a document under test as a derived check. In some implementations, portion 1208 of the data assembly object is generated by the derived information encoder 408 from derived information. For example, the position and size of the bounding box and the font are generated by the templating engine 414.

It should be recognized that FIG. 12 is merely one example of a section of an example document assembly object and that the document assembly object may differ therefrom without departing from the disclosure herein. For example, the document assembly object (not shown) for the CADL 500 may include a derived check to (1) determine whether the numbers present in the DOB field bounding box are consistent with the numbers in the bounding box overlaying the facial image and the numbers in the bounding box on the right side of the CADL next to the boot of the man panning for gold; (2) determine whether the face in the facial image 510 and ghost image 520 are the same; and (3) whether the sex (e.g., as determined by a AI/ML model such as a classifier using the facial image 510) of the person pictured is consistent with the sex identified in the "SEX" field (i.e., "F" as illustrated), (4) whether the age (e.g., as determined by a AI/ML model such as a regression model using the facial image 510) of the person pictured is consistent with the age indicated by the DOB, etc.

Figure 13:
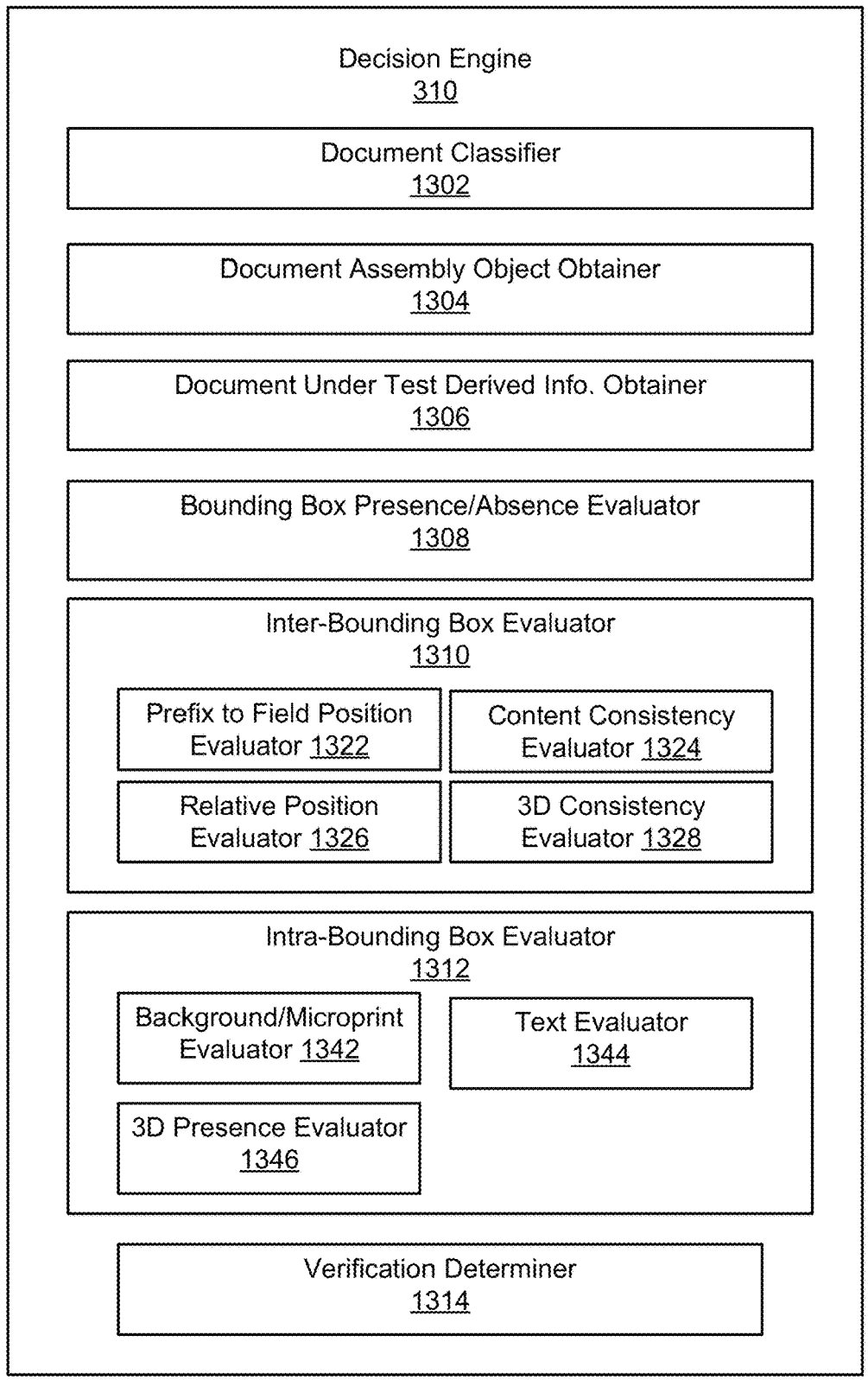
FIG. 13 is a block diagram of an example decision engine in accordance with some implementations.

The decision engine 310 obtains an image of a document under test (e.g., a post-processed document under test) and evaluates the document under test to determine whether the document under test is valid or invalid (e.g., void, modified, tampered with, or forged). Referring to FIG. 13, a block diagram of an example decision engine 310 is illustrated in accordance with some implementations. In the illustrated implementation, includes a document classifier 1302, a document assembly object obtainer 1304, a document under test derived information obtainer 1306, a bounding box presence/absence evaluator 1308, an inter-bounding box evaluator 1310, an intra-bounding box evaluator 1312, and a verification determiner 1314.

The document classifier 1302 obtains an image of a document and determines a document classification associated with the document under test. For example, the document classifier 1302 receives a post-processed version of a document image taken by a user's smartphone camera and determines a class of the document. For example, referring to FIG. 14A, an image of a document under test, which is CADL 1400, is illustrated. In some implementations, the CADL 1400 illustrated is a post-processed image based on an image of the CADL taken using a user's cellphone camera and rectified by the image preprocessor 302 to generate the CADL 1400 image shown. In some implementations, the document classifier 1302 determines that the CADL 1400 belongs to the same class as CADL 500. For example, the document classifier 1302 returns the concatenated set labels DL_US_REGULAR-DL_CA_2018_0 as the CADL 1400's class.

The document assembly object obtainer 1304 obtains the document assembly object associated with that class or set of labels. For example, the document assembly object obtainer queries the document database 242 using at least a subset of the set of labels and obtains the document assembly object generated at least in part based on the CADL 500 example of a valid instance discussed above.

The document under test derived information obtainer 1306 obtains derived information associated with the document under test. For example, the document under test derived information obtainer 1306 passes CADL 1400 image to the OCR engine 306 and/or the object detection engine 308 and receives derived information therefrom. For example, the document under test derived information obtainer 1306 receives one or more of at least one bounding box associated with an object from the object detection engine 308 and at least one bounding box associated with text from the OCR engine 306 along with information describing the bounding box content (e.g., the textual content and font from the OCR engine 306 or the object detected from the object detection engine 308).

The bounding box presence/absence evaluator 1308 evaluates whether a bounding box associated with content is present or absent. For example, in some implementations the bounding box presence/absence evaluator 1308 determines whether a particular security feature (e.g., laser perforations or a ghost image) object is present or absent; the latter being indicative of invalidity. As another example, in some implementations, the bounding box presence/absence evaluator 1308 determines whether a mandatory field is absent. As another example, in some implementations, the bounding box presence/absence evaluator 1308 determines whether an object indicative of invalidity (e.g., a hole punch, clipped bottom-right corner, or vertical text, which may indicate that the document is expired or otherwise void) is present.

The inter-bounding box evaluator 1310 evaluates one or more of a relationship between a plurality of bounding boxes, or contents therein, and a relationship between a bounding box and document itself. Examples of a relationship between a plurality of bounding boxes include, but are not limited to, a relative position between two bounding boxes, such as a bounding box associated with a field prefix and the field, and a consistency of content between the plurality of bounding boxes. Examples of a relationship between a bounding box and document itself include, but are not limited to, a size or position of a bounding box relative to a reference point (e.g., a corner or edge) of the document. The example inter-bounding box evaluator 1310 illustrated in FIG. 13 includes a prefix to field position evaluator 1322, a content consistency evaluator 1324, a relative position evaluator 1326, and a 3D consistency evaluator 1328.

In some implementations, the OCR engine 306 may assign a bounding box to individual characters. For example, the OCR engine 306 may assign a bounding to each character in a field and the inter-bounding box evaluator 1310 may evaluate the relationship(s) between those bounding boxes and/or their content. For example, the inter-bounding box size and spacing representative of inter-character spacing and relative heights, may be analyzed and may identify inconsistencies associated with a single character in field being changed (e.g., a single digit in the year to make the document appear to still be valid, or so the cardholder appears older to satisfy a minimum age requirement). As another example, the OCR engine 306 may assign a bounding box to individual characters from the DOB printed in tactile text over the facial image (in addition to or instead of bounding box 616 of FIG. 6). In some implementations, characteristics of those characters may be compared to one another to determine, as described further below, whether the specular reflection indicates a common light source between characters.

In some implementations, the inter-bounding box evaluator 1310 includes a prefix to field position evaluator 1322. The prefix to field position evaluator 1322 determines whether the relative positions of the bounding boxes for a field prefix and corresponding field are consistent with the bounding box template of the document assembly object. For example, the prefix to field position evaluator 1322 evaluates the spatial relationship between a bounding box associated with a field prefix (e.g., "DOB" in FIG. 14A) and the bounding box associated with the field (e.g., "08/31/22" in FIG. 14A). In the example CADL 1400 it may not be visually apparent to a person, but the test "08/31/22" and its associated field is slightly closer to the "DOB" prefix in FIG. 14A than FIG. 5 and slightly misaligned vertically.

It should be recognized that, while some of the issues in CADL 1400 under test are readily apparent to a human, the illustrated, invalid document under test (i.e., CADL 1400) is intentionally unsophisticated and the example issues are relatively apparent and numerous for discussion purposes and clarity of demonstration. Digital image manipulation (e.g., using photoshop) is increasingly available and used by nefarious individuals to generate fraudulent documents, and fraud attempts vary in levels of sophistication. The computer-vision (e.g., OCR, object detection, similarity matching, and anomaly detection) based methods described herein may beneficially detect even sophisticated fraud attempts by identifying issues undetectable to a human eye, such as an imperceptible (to a human) discrepancy in the relative positions between bounding boxes or within the document itself, artifacts generated by the digital manipulation, microprint errors, differences in bounding box dimensions (e.g., due to usage of a slightly larger font or exceeding a width for the field), etc. In some implementations, the computer-vision based methods described herein account for potential errors, or variances, in the computer-vision assigned bounding boxes (e.g., position and/or bounding box dimensions), thereby reducing false positives for invalidity or manipulation due to such variances or errors. For example, one or more of at least one position or at least one dimensions may have an acceptable margin of error (e.g., a threshold value or percentage/factor) associated therewith.

Figure 14A:
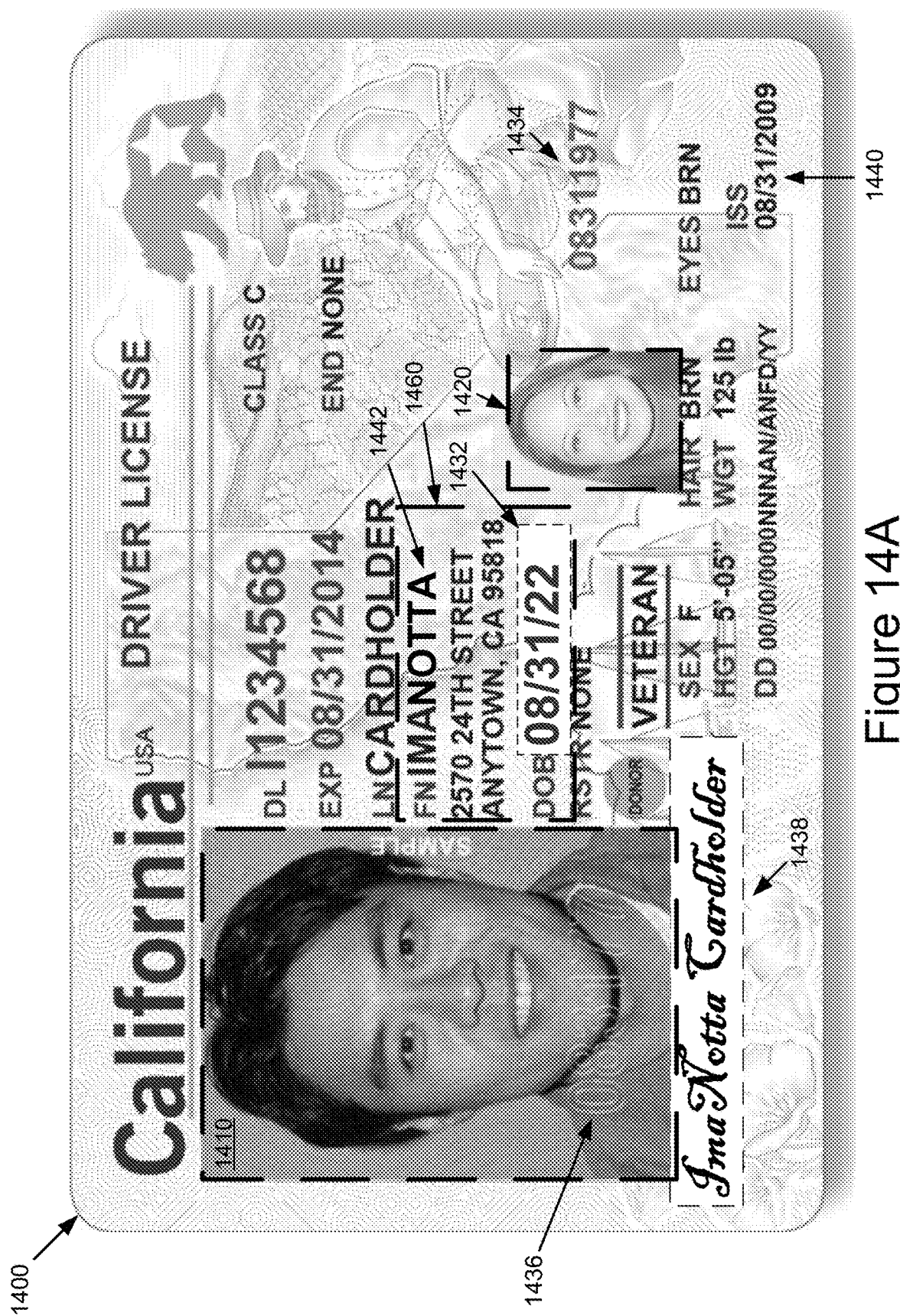
FIGS. 14A and 14B illustrate an example of a CADL under test and portions thereof in accordance with some implementations.

In some implementations, the inter-bounding box evaluator 1310 includes a content consistency evaluator 1324. The content consistency evaluator 1324 evaluates whether content in two or more bounding boxes in the document under test, which are expected to contain consistent content per one or more checks (direct and/or derived) in the document assembly object, are consistent. In some implementations, the content consistency evaluator 1324 evaluates a consistency of content between two or more fields. For example, the content consistency evaluator 1324 evaluates whether the content of the DOB field 1432 (i.e., 08/31/22) is consistent with the DOB in field 1434 (i.e., 08311977), and field 1436 (i.e., 083177), which is not that case as the year 2022 is not consistent with the year 1977 in fields 1434 and 1436 of FIG. 14A. As another example, in some implementations, the inter-bounding box evaluator 1310 may compare the face in a gray scaled version of the facial image 1410 to the face in the ghost image 1420 to determine similarity or lack thereof as illustrated in FIG. 14A. As another example, the content consistency evaluator 1324 may determine the gender of face (i.e., male in 1410) in the facial image 1410 (e.g., using an AI/ML model) and compare that sex field (i.e., "F" for female in CADL 1400) for consistency, or lack thereof, as is the case in CADL 1400. As another example, in some documents, there is an equivalent of a check sum (e.g., an alpha-numeric reference number that may be a composite of information in various fields such as the initials concatenated with the date of birth or year of issuance), and the checksum may be evaluated to determine whether it is consistent with the content in the bounding boxes from which the checksum is derived. It should be recognized that, while the preceding examples refer to consistencies between information associated with a single side of a document (i.e., the front as described), in some implementations, the inter-bounding box evaluator 1310 may evaluate consistency between bounding boxes on different sides of the document (e.g., by performing a similarity check between the signature 1438 and a signature on the back (not shown) of the CADL 1400 under test.

In some implementations, the inter-bounding box evaluator 1310 includes a relative position evaluator 1326. For example, in some implementations, the relative position evaluator 1326 determines the relative position of a bounding box within the document under test. For example, in some implementations, the relative position evaluator 1326 determines that the position of the facial image 1410 is too close to the left edge of the document and/or the signature 1438 bounding box extends too far up from the bottom edge of the document under test, i.e., CADL 1400, based on a bounding box template included in the document assembly object.

In some implementations, functionality of one or more of the bounding box presence/absence evaluator 1308 and the inter-bounding box evaluator 1310 is at least partially performed by comparing the bounding box template to the bounding boxes derived from the document under test to determine whether overlap exists. For example, a determination is made as to whether the bounding boxes in the document under test are within the template bounding boxes or within a predetermined margin of error, which may account for variances and misalignments that may occur during the printing of valid documents. In some implementations, when an overlap exists the content of the overlapping bounding boxes (e.g., a security feature object, field, field prefix, etc.) expected to be present is present and in the expected relative position. In some implementations, when there is no overlap, e.g., a detected object is not present in the bounding box template of the document assembly object or a bounding box associated with an expected (e.g., mandatory) object or text is absent, the bounding box presence/absence evaluator 1308 and/or the inter-bounding box evaluator 1310 may extend the area of search.

In some implementations, the inter-bounding box evaluator 1310 includes a 3D consistency evaluator 1328, which is described further below.

The intra-bounding box evaluator 1312 performs one or more intra-bounding box evaluations. Examples of intra-bounding box evaluations include, but are not limited to, one or more of an evaluation of the microprint within a bounding box (e.g., using color information and/or a reconstructed microprint or snippet thereof), an evaluation of the textual content within a bounding box (e.g., the textual content, font, font size, font style, capitalization, font color, inter-character spacing, dimensionality, bounding box width consistency with expectation for number of characters present, etc.), an evaluation of the object in the box (e.g., to see if an object such as a seal is intact, has the expected dimensionality, is occluded, or is modified), a purported signature is consistent with a font (e.g., Lucida Console which is used by some as a font for electronic signatures), etc.

In some implementations, the intra-bounding box evaluator 1312 includes a background/microprint evaluator 1342. The background/microprint evaluator 1342 analyzes (e.g., using similarity matching or anomaly detection) the background/microprint within a bounding box associated with a document under test to determine whether the background/microprint, or lack thereof, indicates manipulation.

Figure 14B:
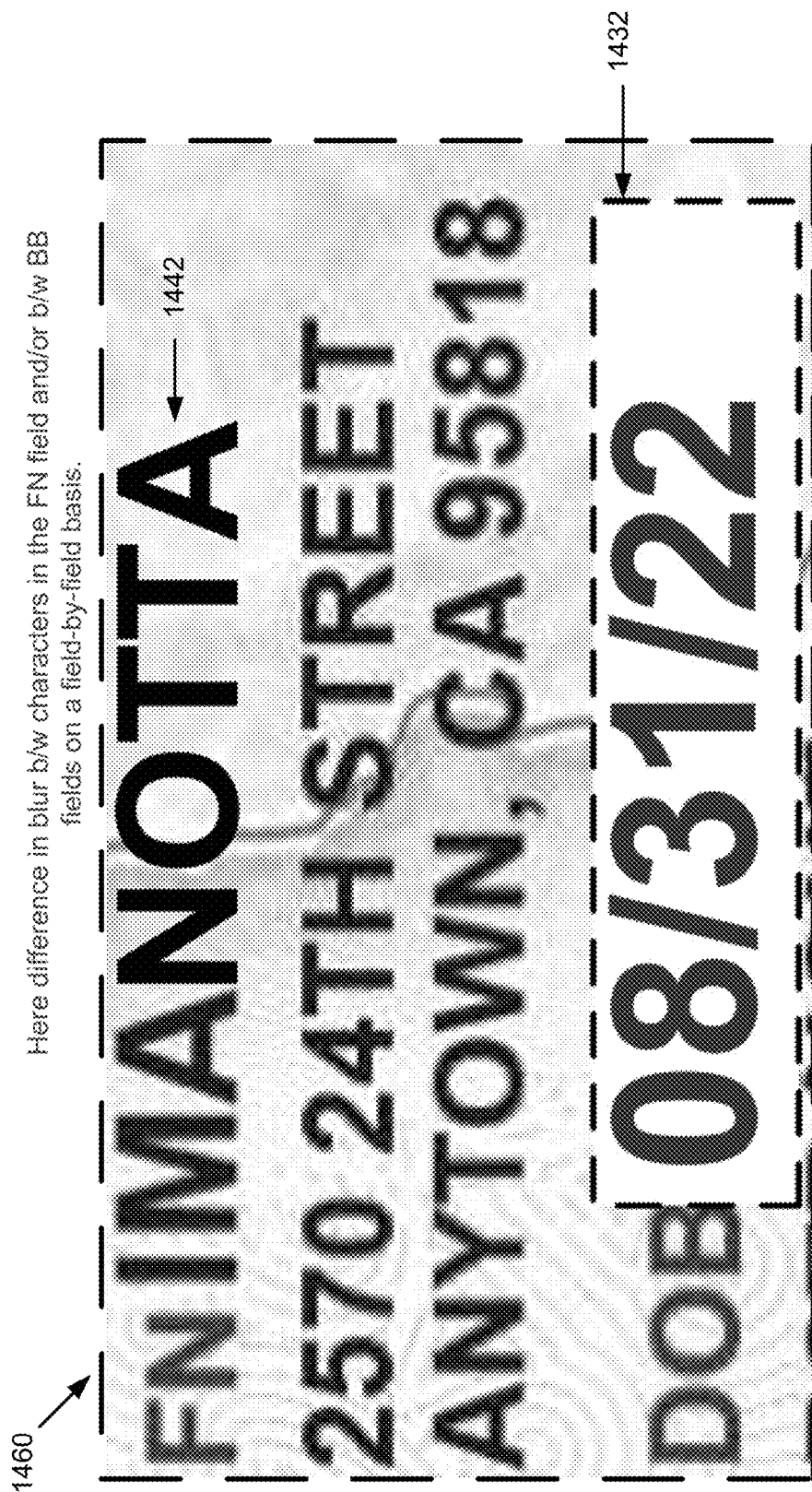

Referring now to FIG. 14B, a portion 1460 of the example CADL 1400 under test is enlarged and illustrated. In FIG. 14B, the date of birth field has been modified by adding new, red text, i.e., 08/31/22, in a text box with a white background, thereby destroying the microprint background in the area associated with the DOB field 1432. In some implementations, the destruction, or alteration, of microprint is determined by background/microprint evaluator 1342 and indicative of manipulation and increases the likelihood that the document under test is invalid. The destruction of the microprint in the DOB field 1432 is fairly apparent for clarity of demonstration, it should be recognized that in some documents under test, the destruction may be more limited and more difficult to detect with the human eye. For example, assume a nefarious person wanted to change the day in the DOB from "31" to "01" and carefully deleted the "3" before adding the "0" in its place. Such a manipulation would result in some white pixels in the center and at the edge of the "0," which may be difficult to see with the human eye due to the small size. If the nefarious user chose to fill those pixels with some adjacent color, rather than leaving it white, the manipulation could be undetectable the human eye. The background/microprint evaluator 1342 may detect such manipulations by evaluating the background/microprint in some implementations.

In FIG. 14B, the first name field 1442 has been modified to read "IMANOTTA" by adding "NOTTA" as a suffix to the "IMA" present in CADL 500. In some implementations, the background/microprint evaluator 1342 evaluates one or more boundaries within a bounding box. For example, in some implementations, the background/microprint evaluator 1342 evaluates one or more boundaries between the background microprint and the edge of the text. When comparing the edge of the "IMA" text to that of the "NOTTA" at 1442, it is apparent that the "NOTTA" text has a crisper edge. In some implementations, the background/microprint evaluator 1342 detects such differences, which may be indicative of digital manipulation, e.g., by detecting sharp changes in pixel intensity that may indicate tampering.

The background/microprint evaluation performed by the background/microprint evaluator 1342 may vary depending on the implementations and use case. Examples of background/microprint evaluation that may be applied by the background/microprint evaluation 1342 may include, but at not limited to, one or more of an average value difference within a bounding box, a comparison between the reconstructed background/microprint and that present in the document under test, and a machine learning model (e.g., a convolutional neural network or other AI/ML model) trained on digitally manipulated text fields over micro print areas.

In some implementations, the background/microprint evaluator 1342 applies an average value difference. For example, the background/microprint evaluator 1342 determines a background (e.g., a portion in the bounding box snippet not obscured by the text or object therein) in the document under test and takes an average color value of that background/microprint. The background/microprint evaluator 1342 determines the corresponding background in the reconstructed background/microprint and obtains that average color value, which is compared to the average color value associated with the document under test to determine whether a match exists. Such an evaluation may detect destroyed or manipulated backgrounds or microprint and may be relatively inexpensive computationally.

In some implementations, the background/microprint evaluator 1342 may analyze color information in the frequency domain, as tall and narrow spikes in the frequency domain may indicate a level of uniformity in color atypical of what would be expected in an image of a document that was not digitally manipulated.

In some implementations, the background/microprint evaluator 1342 compares a snippet of the document under test to a corresponding snippet from the reconstructed background/microprint to determine whether a difference exists between the portion(s) of the background/microprint in the document under test that are unobstructed by text or an object and the reconstructed microprint.

In some implementations, the background/microprint evaluator 1342 trains and applies a machine learning (ML) model trained on digitally manipulated text fields over microprint areas. For example, the background/microprint evaluator 1342 trains and applies a convolutional neural network or other machine learning model the manipulations (e.g., to identify whether a boundary of the text or associated artifacts are indicative of fraud).

In some implementations, the intra-bounding box evaluator 1312 includes a text evaluator 1344. The text evaluator 1344 determines one or more of a similarity and an anomaly between the text of a document under test and the text described in the document assembly object, which describes and/or represents (e.g., using snippets) valid instances of the document or portions thereof.

In some implementations, the text evaluator 1344 evaluates one or more of a textual content, font, font size, font style, orientation (e.g., horizontal or vertical), capitalization, font color, intercharacter spacing, bounding box width consistency with expectation for number of characters present, dimensionality (e.g., 2D or 3D, if 3D whether raised or recessed), etc. associated with text in the document under test and determines whether the one or more of the textual content, font, font size, font style, orientation, capitalization, font color, intercharacter spacing, bounding box width consistency with expectation for number of characters present, dimensionality, etc. are consistent with that/those of a valid document. For example, assume the CADL 1400 under test is processed by the OCR engine 306, bounding boxes analogous to 602 and 604 in FIG. 6 and associated snippets, as represent by snippets 1502 and 1504 in FIG. 15, respectively, are generated.

Figure 15:
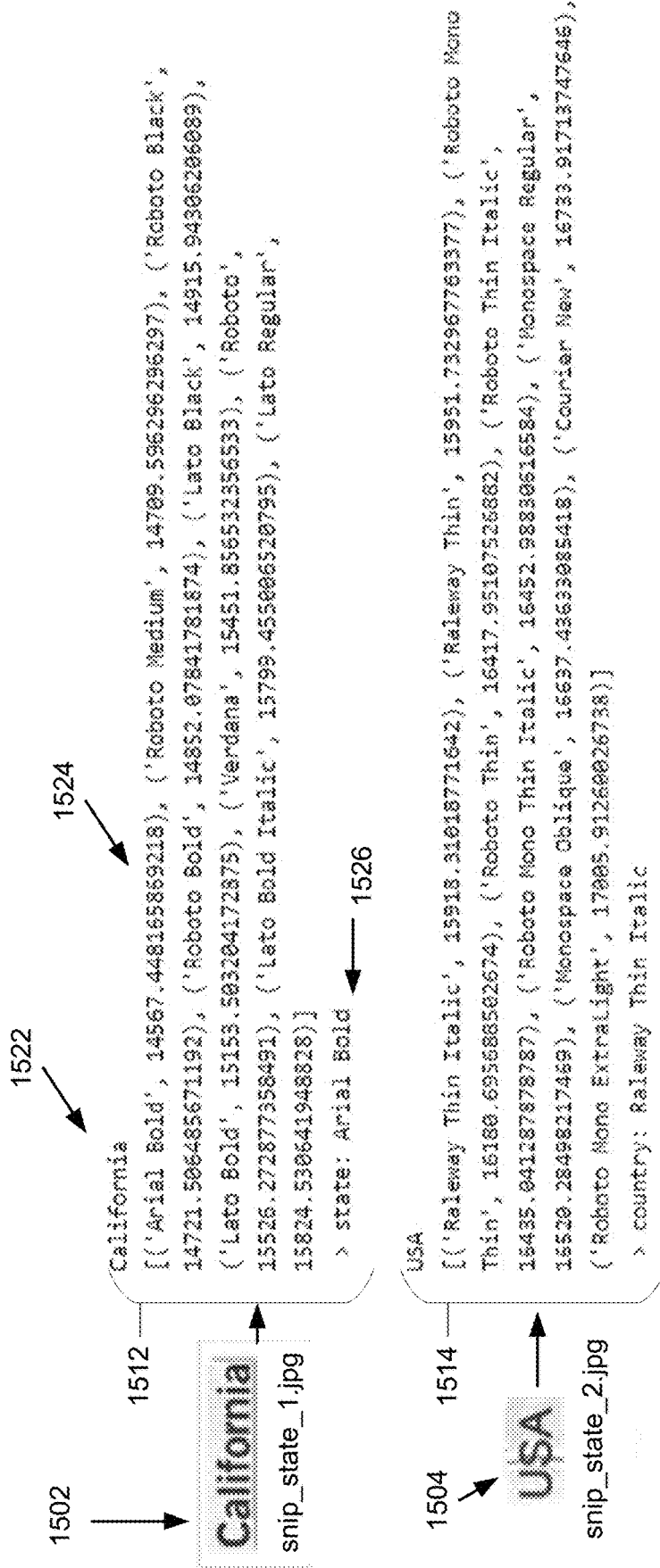
FIG. 15 illustrates examples of an intra-bounding box text evaluation in accordance with some implementations.

Referring to FIG. 15, in some implementations, the text evaluator 1344 may analyze the text (e.g., in a snippet). In the illustrated implementation, the text evaluator 1344 has analyzed snippet 1502, thereby generating the result set 1512, and analyzed the snippet 1504, thereby generating the result set 1514. In the illustrated implementation, the result 1512 includes the text (i.e., "California") present in snippet 1502; a set, or subset, of fonts recognized by the text evaluator (e.g., "Arial Bold," "Roboto Medium," etc.) and a similarity, or dissimilarity, score associated with each font in the provided set (e.g., "14567.448 . . . " and "14709.592 . . . ," etc., respectively), and the font determined to be present in snippet 1502 (i.e., "Arial Bold.") and a tag or label (i.e., "state" in result 1512). The result 1514 includes analogous components. The text evaluator 1344 may compare the text content (e.g., "California") and the font characteristics (e.g., "Arial Bold") to the text content and font characteristics included in the document object assembly object to determine whether a match exists.

It should be recognized that the snippets 1502 and 1504, the results 1512 and 1524, and components of the results, e.g., 1522, 1524, and 1526, are merely examples and variations are expected and within the scope of this disclosure. For example, while snippets that are more likely to be modified (e.g., associated with a name field, DOB, etc.) are not shown, such snippets are evaluated in some implementations. As another example, the illustrated results show a determined font (i.e., "Arial Bold" at 1526), which may be compared to the font in the document assembly object determined, from one or more valid instances of the document, for that portion of the ID. In some implementations, the text evaluator 1344 may determine other or additional characteristics of the text such as, but not limited to, one or more of a font size (e.g., 8 pt.), font color (e.g., using the red, green, blue (RGB) or cyan, magenta, yellow, black (CMYK) or other color representation model), font style (e.g., italic, bold, underlined), orientation (e.g., horizontal or vertical), and the capitalization scheme (e.g., all caps, caps and small caps, or caps and lower case letters), which may be compared to corresponding information in the document assembly object.

It should be noted that, while dimensionality is described above with reference to the text evaluator 1344, tactile text is merely one possible three-dimensional security feature and others exist and may be evaluated consistent with the description herein. For clarity and convenience, the evaluation of three-dimensional security feature(s) in a document image is described herein mostly in reference to the 3D consistency evaluator 1328 and the 3D presence evaluator 1346. However, it should be recognized that the features and functionality described with reference to the 3D consistency evaluator 1328 and the 3D presence evaluator 1346 may be moved to other components, subcomponents, sub-subcomponents, etc. of the system 100 described herein without departing from this disclosure. For example, the processing of an image snippet to derive dimensional data is described below in reference to the 3D presence evaluator 1346. However, in some implementations, the image preprocessor 302 may process a snippet and derive the dimensional data, which is provided to one or more of the 3D presence evaluator 1346 and 3D consistency evaluator 1328.

In some implementations, the intra-bounding box evaluator 1312 includes a 3D presence evaluator 1346. The 3D presence evaluator 1346 determines whether a three-dimensional security feature is present in the document under test. For example, the 3D presence evaluator 1346 determines (e.g., from the document object model) that valid instances of the document class (e.g., the version of the CADL represented by CADL 500) include one or more three-dimensional security features and determines whether the expected three-dimensional security feature(s) are present in the document under test or portion(s) thereof.

In some implementations, the 3D presence evaluator 1346 identifies, using the document object model associated with the class of document determined for the document under test, a portion of the document under test that is associated with a three-dimensional security feature in valid document instances. For example, using the document object model, the 3D presence evaluator 1346 identifies at least a portion of the document under test expected to include a three-dimensional security feature, occasionally referred to as an area of 3D interest, which may be associated with one or more image snippets. In the case of the version the CADL represented by example CADL areas of 3D interest on the front of that document may include the tactile text of a DOB superimposed on the facial image or a subset thereof, a raised signature or portion thereof, or other areas.

Figure 22:
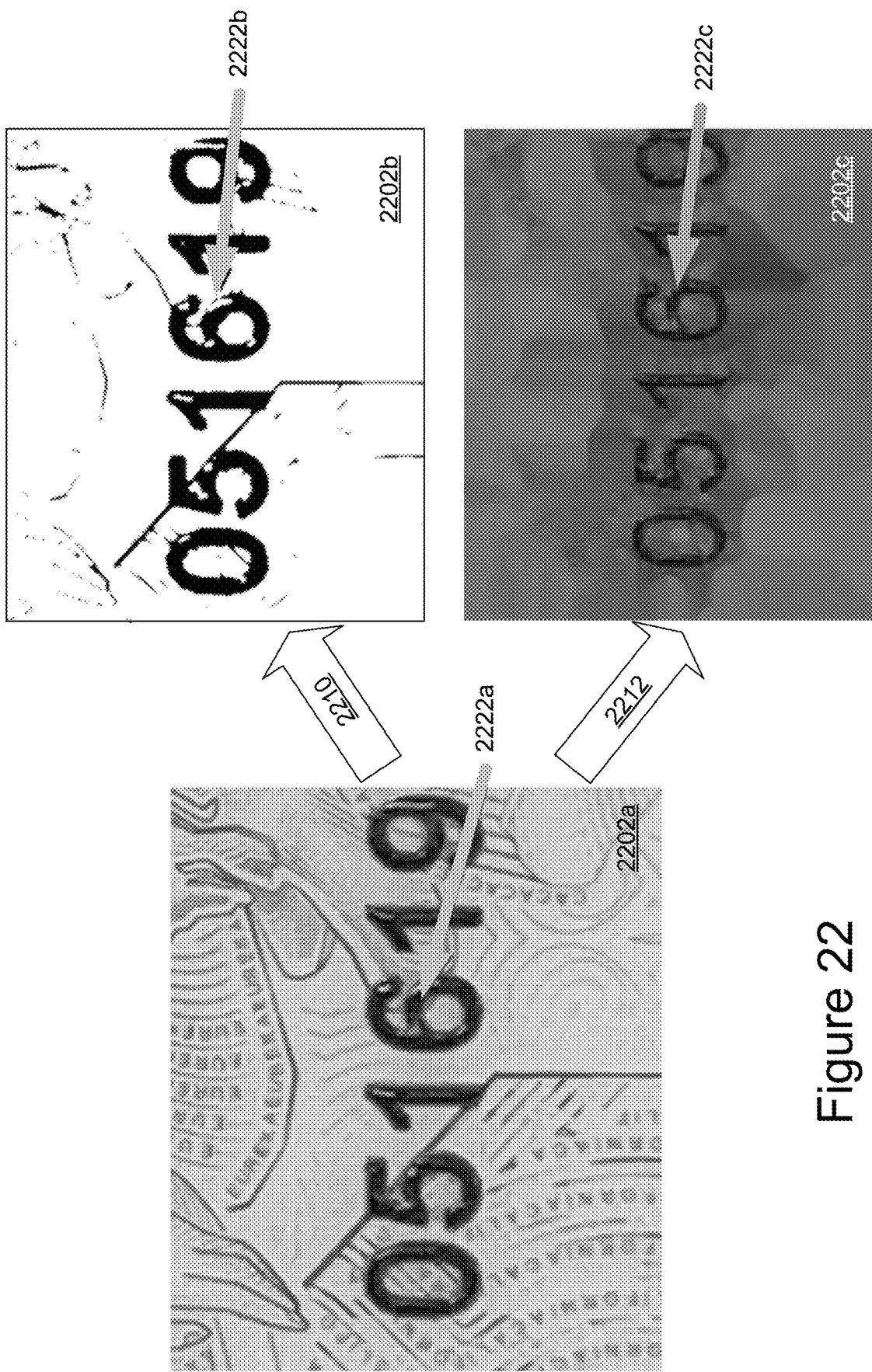
FIG. 22 illustrates an example of a three-dimensional area of interest and derived dimensional data in accordance with some implementations.

It should be recognized that three-dimensional security features may generate visual artifacts in a two-dimensional image representation. For example, referring to FIG. 22, a 3D area of interest is shown in accordance with some implementations. More specifically, image snippet 2202a shows a portion of tactile (raised) text including the numerals "051619." Referring to the numeral "6," at 2222a, note that the numeral is covered in black ink and, while the black ink is homogenous in color, there is specular reflection from a light source to the upper-right, which causes highlights (i.e., variation in intensity) and color variation on certain portions of the "6." In some implementations, the 3D presence evaluator 1346 may use visual artifacts in the 2D image to generate dimension data, i.e., data representing the presence or absence of the third dimension.

It should be recognized that, most fraudsters manipulating images (e.g., using image editing software, such as Adobe photoshop) to commit fraud either use copy-paste portions from other documents or use overlays (e.g., add a text box and overwrite information). The 3D consistency evaluator 1328 and/or the background/microprint evaluator 1342 may thwart the former. The derivation and use of the dimensional data, by the 3D presence evaluator 1346, described below, may thwart the latter, as the dimensional data associated with inserted flat text would indicate an absence of three-dimensionality.

Depending on the implementation, the 3D presence evaluator 1346 or the image preprocessor 302, may, alone or in combination, derive dimensional data associated with an area of 3D interest. The dimensional data may vary based on the implementation and use case including the class of the document under test and/or the three-dimensional security feature present in valid instances.

In some implementations, the dimensional data generated for an area of 3D interest is based on intensity and represents variation in intensity in the image (e.g., a snippet) of the area of interest. For example, referring to FIG. 22, in some implementations, the 3D presence evaluator 1346 generates, at 2210, dimensional data 2202*b* based on the area of 3D interest 2202*a*. For example, in some implementations, the 3D presence evaluator 1346, for each pixel in image snippet 2202*a*, determines, at 2210, a pixel intensity. When the pixel intensity satisfies a threshold, the pixel is assigned a first color (e.g., white) in the dimensional data 2202*b*, and when the pixel fails to satisfy the threshold, the pixel is assigned a second color (e.g., black) in the dimensional data 2202*b*, thereby resulting in the dimensional data 2202*b*, which is an intensity representation of the area of 3D interest.

In some implementations, the dimensional data generated for an area of 3D interest is based on color and represents a variation in color in the area of interest. For example, in some implementations, the 3D presence evaluator 1346, for each pixel in image snippet 2202*a*, determines a color component and generates dimensional data. In some implementations, the color component is associated with a color channel. For example, when the numeral associated with the red channel in an RGB image satisfies a threshold, the pixel is assigned a first color (e.g., red), and when the pixel fails to satisfy the threshold, the pixel is assigned a second color (e.g., white). In some implementations, the process may be repeated for each color channel, for example, assigning green or white for the green channel and blue or white for the blue channel. Depending on the implementation, the set of individual color channel results (not shown) or a compilation the color channel results (not shown) may be included in the dimensional data.

In some implementations, the dimensional data generated for an area of 3D interest is based on a nearest neighbor analysis. For example, in some implementations, the 3D presence evaluator 1346, applies a nearest neighbor with in-fill approach to the area of 3D interest 2202*a* and generates dimensional data 2202*c* as a three-dimensional representation of the area of 3D interest. While in-fill is more typically used in image processing to remove a background in an image, in some implementations, the 3D presence evaluator 1346 applies in-fill to increase a contrast between objects not on the same layer and thereby generate data describing the three dimensionality of an object in an image.

In some implementations, the dimensional data generated for an area of 3D interest is based on a composite image of the area of 3D interest. For example, the 3D presence evaluator 1346 obtains a depth map from the image preprocessor 302 or generates a depth map as dimensional data.

Figure 23:
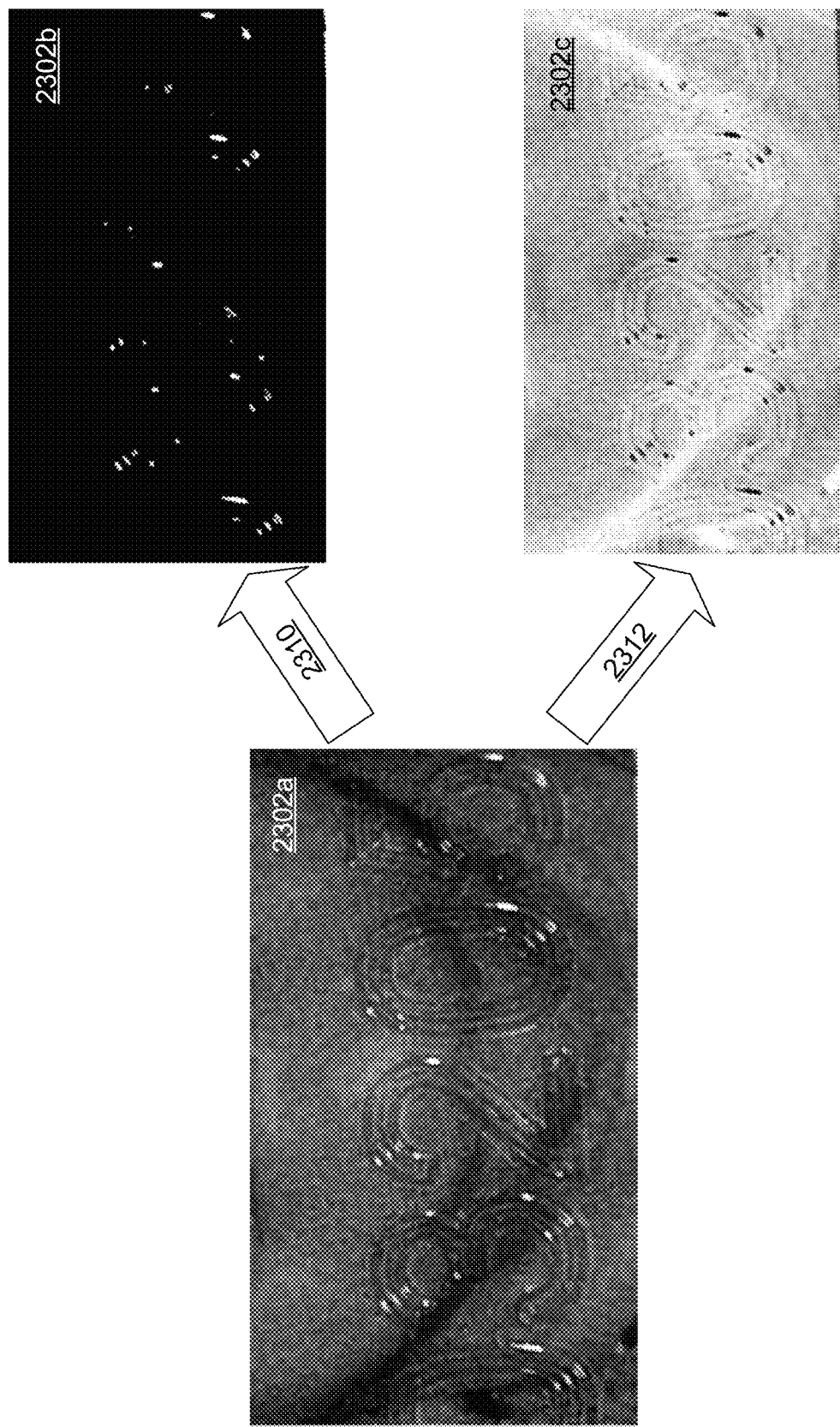
FIG. 23 illustrates another example of a three-dimensional area of interest and derived dimensional data in accordance with some implementations.

Referring to FIG. 23, an example of an area of 3D interest and derived dimensional data is illustrated in accordance with some implementations. In FIG. 23, a portion 2302*a* of an image of a CADL under test is shown. For context, this is ribbed text roughly located where bounding box 616 is shown on CADL 500 in FIG. 6 and at 1436 in FIG. 14A, and, in valid CADL instances, includes the same DOB as found elsewhere on the document. In some implementations, the 3D presence evaluator 1346 generates, at 2310, dimensional data 2302*b* based on pixel intensities in 2303*a*. In some implementations, the 3D presence evaluator 1346 generates, at 2312, dimensional data 2302*c* based on color variations in 2303*a*, in the illustrated example implementation, the color variation in the blue channel is used, and the spectral reflection highlights are depicted in black.

It should be recognized that the foregoing are merely examples of dimensional data and how dimensional data may be derived. Other examples exist and are within the scope of this disclosure. For example, some client devices 106 (e.g., some mobile phones) may include a Light Detection and Ranging (LIDAR) sensor and/or Radio Detections and Ranging (RADAR) sensor, and the dimensional data may include LIDAR and/or RADAR sensor data.

The 3D presence evaluator 1346 processes the dimensional data to determine whether the dimensional data is consistent with the presence of the expected 3D security feature. For example, the 3D presence evaluator 1346, based on the dimensional data, determines whether the area of 3D interest is raised, when the 3D security feature in valid instances is supposed to be raised, or recessed, when the 3D security feature in valid instances is supposed to be recessed. In some implementations, the 3D presence evaluator 1346 may use one or more thresholds to determine whether the degree to which the area of 3D interest is three-dimensional is consistent with an expected range to accommodate tolerances in the document printing process and/or a margin of error. In some implementations, the margin of error may vary based on the type of dimensional data generated, the device used to capture the document image, ambient conditions, etc.

It should be recognized that the 3D presence evaluator 1346 may detect the absence of a three-dimensional security feature, e.g., as result of a user having replaced tactile text with flat text in a document under test. However, in some implementations, the 3D presence evaluator may not, in isolation, detect when a nefarious user copy-pastes a three-dimensional security feature into the document under test. Therefore, in some implementations, one or more cross-checks are performed to determine consistency between different portions of a single security feature (e.g., different characters in the same tactile text field) between security features (e.g., between a raised signature field and a tactile text DOB field) to identify manipulations that maintain three-dimensionality, e.g., through copy-pasting. In some implementations, the consistency checks are performed by a 3D consistency evaluator 1328.

In some implementations, the 3D consistency evaluator 1328 is communicatively coupled to the 3D presence evaluator 1346. For example, in some implementations, the 3D consistency evaluator 1328 to receive a trigger indicating that all evaluated areas of 3D interest indicated the presence of the expected three-dimensional security feature. This may beneficially save time and computational resources, as if, e.g., a flat character in a tactile text field, the document is unlikely to be valid and it may not be an effective use of time and computational resources to compare the flat character or other 3D characters to determine whether an inconsistency further indicative of manipulation/invalidity is present. As another example, in some implementations, the 3D consistency evaluator 1328 is communicatively coupled to receive the dimensional data from the 3D presence evaluator 1346 or retrieve dimensional data stored by the 3D presence evaluator 1346.

In some implementations, the inter-bounding box evaluator 1310 includes a 3D consistency evaluator 1328. The 3D consistency evaluator 1328 evaluates whether dimensional data between two portions of a document image (e.g., represented in image snippets) is consistent. Depending on the implementation and use case, the two image snippets may be associated with a common three-dimensional security feature or different three-dimensional security features.

In some implementations, two or more image snippets may be associated with a common three-dimensional security feature. For example, in some implementations, individual characters may be associated with their own individual snippet, so the six numerals (i.e., the two digits corresponding to birth month followed by two digits corresponding to the day of birth within that month followed by last two digits of the year of birth) at 1436 in CADL 1400 may be associated with six image snippets (not shown), and the dimensional data between two or more of those six snippets may be compared.

It should be recognized that, by performing a comparative analysis of dimensional data between portions of a common three-dimensional security feature, the 3D consistency evaluator 1328 may identify various types of attempted fraud. For example, in the valid instance of the CADL such as CADL 500, the card holder's signature is raised. Consider a scenario where, instead of the flat text "ImaNotta Cardholder" signature illustrated at 1438 in FIG. 14A, the signature 1438 was generated by copy-pasting the signed last name "Cardholder," illustrated at 620 in FIG. 6, from valid instance CADL 500 and/or a signed first name "ImaNotta" from a second valid instance of the CADL (not shown) where a card holder with the first name "ImaNotta" signed his/her name. In that scenario, the 3D presence evaluator 1346 may determine, in some implementations, that the raised signature, as a three-dimensional security feature, is present. However, the 3D consistency evaluator 1328 may compare the first name dimensional data to the last name dimensional data and identify an inconsistency. As another example, the dimensional data associated with individual tactile text DOB digits at 1436 may be compared to one another to determine whether an inconsistency is present.

In some implementations, the inconsistency may represent a difference in light source between portions of the three-dimensional security feature. When the three-dimensional security feature is captured in an image, the imaged portions of the three-dimensional security feature should have a light source in common. The light source may be ambient lighting, whether natural (i.e., sun light) or artificial (e.g., based on light fixtures) or induced lighting, such as a flash (which may be triggered to increase specular reflection). Thus, when one digit in the tactile DOB field 1436, or a first portion of the signature 1438, is determined to be illuminated from the left and another digit, or another portion of the signature 1438) is determined to be illuminated from the upper right, the document image 1400 has likely been manipulated, since it is unlikely, if not impossible, to have different light sources simultaneously. Therefore, it is more likely that one of the digits or signature portions is copy-pasted from another document image.

In some implementations, the 3D consistency evaluator 1328 determines the inconsistency in the light source based on one or more of specular reflection and ray tracing. For example, the 3D consistency evaluator 1328 performs ray tracing on a first area of 3D interest (e.g., using a 3D representation of the first area of 3D interest, such as dimensional data generated using the nearest neighbor and in-fill), performs ray tracing on a second area of 3D interest (e.g., using a 3D representation of the first area of 3D interest, such as dimensional data generated using the nearest neighbor and in-fill), and determines the position of the light source relative to the two areas of 3D interest is inconsistent. As another example, the 3D consistency evaluator 1328 determines a relative position of the light source relative to a first area of 3D interest, determines a relative position of the light source relative to a second area of 3D interest, and determines whether the two areas of interest have an inconsistent light source location (e.g., by controlling for the positions of the two areas of interest relative to one another). For example, in some implementations, the 3D consistency evaluator 1328 may assign each area of 3D interest a vector pointing toward that area's light source and determine whether the set of assigned vectors fail to intersect within a margin of error, as a first light source vector that fails to point toward a point of intersection for other light source vectors (e.g., two other light source vector, a plurality of light source vectors, a majority of the light source vectors, or a super majority of the light source vectors, etc.) is suspicious and indicative of the document under test having been manipulated.

In some implementations, the inconsistency is an inconsistency in the position of a light source, e.g., relative to 3D areas of interest. In some implementations, the 3D consistency evaluator 1328 may analyze different aspects of the light source to determine whether inconsistencies exist. For example, the color temperature of the specular reflection may be examined by the 3D consistency evaluator 1328. For example, assume there are highlights on two numerals of the same field, so the numerals are of the same color, but the white highlight on a first numeral has a first temperature (e.g., is a color temperature consistent with the mobile device's flash setting, which was used to induce specular reflection) and the second numeral has a second color temperature (e.g., around 5000K, which is more typical of daylight), the 3D consistency evaluator 1328 may determine, based on color temperature of the specular reflection, that an inconsistency exists.

As described above, three-dimensional security feature analysis may be performed across two or more three-dimensional security features, e.g., performed on a security feature-by-security feature basis, performed on a security feature component-by-security feature component basis, or a combination thereof.

In some implementations, the evaluations by one or more of the bounding box presence/absence evaluator 1308, the inter-bounding box evaluator 1310, the intra-bounding box evaluator 1312, or the subcomponents 1322, 1324, 1326, 1328, 1342, 1344, 1346, thereof may use a direct check or derived check included in the document assembly object. For example, referring to portion 1206 of FIG. 12, three heuristic rules are included as checks. In some implementations, the intra-bounding box evaluator 1312 may use these rules from the document assembly object to generate the intermediate results of whether the document number is the correct length and alphanumeric composition.

In some implementations, the outcome of any one of the evaluations performed by one or more of the bounding box presence/absence evaluator 1308, the inter-bounding box evaluator 1310, the intra-bounding box evaluator 1312, or the subcomponents 1322, 1324, 1326, 1328, 1342, 1344, 1346, thereof may not be definitive for determining whether the document under test is valid or invalid. For example, an inconsistency between the font determined by the text evaluator 1344 and the font in the document assembly object may not definitively indicate that document is invalid, since the font determination (e.g., a font classifier applied by the text evaluator 1344) may have trouble distinguishing between those two fonts. Accordingly, the results of the evaluations performed by one or more of the bounding box presence/absence evaluator 1308, the inter-bounding box evaluator 1310, the intra-bounding box evaluator 1312, or the subcomponents 1322, 1324, 1326, 1328, 1342, 1344, 1346 thereof are occasionally used and referred to as intermediary results.

The verification determiner 1314 determines whether to verify the document under test. In some implementations, the verification determiner 1314 obtains at least a subset of the intermediary results generated by one or more of the bounding box presence/absence evaluator 1308, the inter-bounding box evaluator 1310 or its subcomponent(s), and the intra-bounding box evaluator 1312 or its subcomponent(s) and, based on at least a subset of the intermediary results, determines whether the document under test is a valid instance of the document. In some implementations, the verification determiner 1314 may obtain the intermediary results from the document database 242.

In some implementations, the verification determiner 1314 obtains other information (e.g., context information, a decision history, etc.) and, based at least in part on the other information, determines whether the document under test is a valid instance of the document. For example, the verification determiner 1314 may query the document database 242 to determine whether the user's information (e.g., client device 106 identifier) is associated with previously received and rejected as invalid documents, to determine whether the document ID number in the document under test (e.g., a driver's license number) has been associated with other verification requests and whether the document was determined to be verified/valid or invalid and/or associated with different information (e.g., different names appearing on different documents with the same doc ID).

Depending on the implementation and use case, the verification determiner 1314 may apply one or more of heuristics, statistical analysis, and AI/ML model(s) to determine whether the document under test is verified. For example, the verification determiner 1314 may determine one or more heuristics, such as reject the document under test as invalid when the facial image and ghost image do not match or reject the document under test as invalid when the content in the DOB field is inconsistent with the content of other related bounding boxes (e.g., not repeated in those portions of the ID). As another example, the verification determiner 1314 may use statistical analysis, such as assigning a value of "1" to an intermediate result that indicates a match/similarity/consistency and a "0" to an intermediary result that indicates an anomaly/mismatch/inconsistency is detected and determining whether an average or weighted average satisfies a verification threshold. For example, the verification determiner 1314 may use machine learning to perform feature set reduction to reduce (e.g., based on information gain) the number of intermediary results (and associated evaluations) used for a particular document and tune associated parameters (e.g., their relative weighting in a weighted average). It should be noted that the above are merely examples of heuristics, statistical analysis, and AI/ML models that may be used by the verification determiner 1314. The verification determiner 1314 may use other or different mechanisms without departing from the disclosure herein.

The verification determiner 1314 returns a verification result. For example, the verification determiner 1314 returns a result to a requesting customer, such as a bank, indicating that the document (e.g., the imaged photo ID) is not verified/invalid or is valid. As another example, the verification determiner 1314 returns a result to other system components, such as a liveness detector (not shown). In some implementations, a liveness detection may be performed before, or in parallel, with evaluation of the document by the document evaluator 226.

In some implementations, the verification determiner 1314 triggers an action or inaction based on the verification result. The liveness detector (not shown) may, e.g., compare a selfie of the user that provided the document image to the facial image in the document. In some implementations, the liveness detector (not shown) may be triggered by the verification determiner 1314 to execute based on the document being verified, as it may not be worth the time and computational resources to determine whether the person in the selfie is the same person in the fake ID document. In some implementations, the verification determiner 1314 may trigger other actions such as contacting law enforcement of the jurisdiction in which the user's client device 106 is located (e.g., to report the attempted fraud or identity theft and providing associated information).

Figure 16:
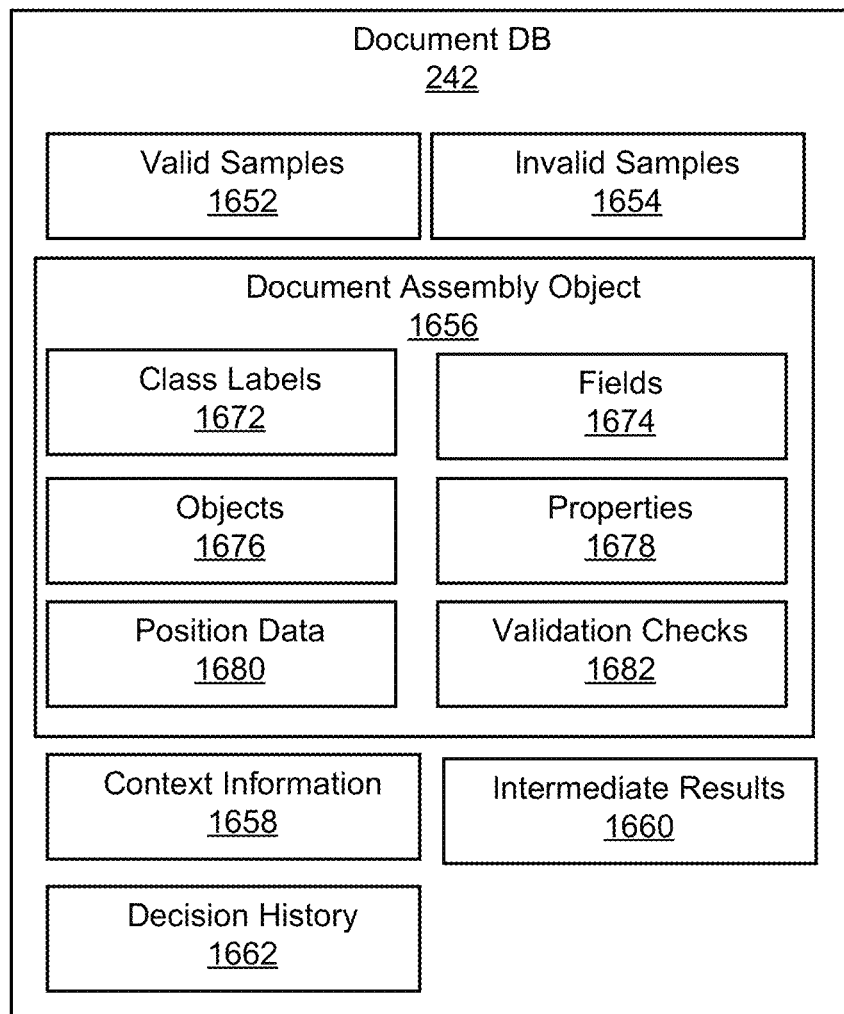
FIG. 16 is a block diagram of an example document database in accordance with some implementations.

Referring now to FIG. 16, an example of a document database 242 is illustrated in accordance with some implementations. The document database 242 manages, stores, and provides information related to documents, which may be used by the system 100 to perform the features and functionalities described herein. The document database 242 may comprise at least one relational database and/or at least one nonrelational database. Therefore, the document database 242 is not necessarily a document-orient database. In some implementations, the document database 242 may comprise a look up table (not shown) or relational database (not shown) with columns for class labels (e.g., document type, country, state, etc.) and a location or pointer of the associated document assembly object. In some implementations, the document assembly objects and snippets may be stored in a nonrelational/NoSQL portion of the document database 242 such as an object-oriented or document-oriented database. In some implementations, the document database 242 may include a graphical database, e.g., a dependency graph defining an order and dependency of various data lookups and verification checks.

The information related to documents stored by the document database 242 may include but, is not limited to, valid samples 1652 (whether provided by the issuer, determined to be verified/valid by the system 100, or both), unverified/invalid samples 1654 (whether provided by the issuer, determined to be verified/valid by the system 100, or both), preprocessed images of document(s) under test (not shown), post-processed images of document(s) under test (not shown), one or more document assembly objects 1656 each associated with a document supported by the system 100, the snippets (not shown) derived from valid samples and/or documents under test, context information 1658, intermediate results 1660 associated with one or more documents under test, and decision history 1662 describing the final verification (valid/invalid) decision for documents under test.

In some implementations, the document database 242 includes representations of fraudulent users, e.g., one or more of a snippet of the facial image from a document determined to be invalid; a facial image associated with a liveness check, such as a selfie, associated with an invalid document; the information provided, or used, by the fraudulent user (e.g., images of the documents, signatures, document class/type used, etc.), which may be used by the system 100 to generate new checks and/or train an AI/ML model to generate validity checks targeting known fraudulent users and/or their methods (e.g., documents of choice).

In some implementations, an instance of a document assembly object(s) 1656 stored by the document database 242 may include one or more of a set of class labels 1672 identifying the document described by the document assembly object 1656, one or more fields 1674 (e.g., mandatory fields, optional fields, field prefixes, etc.), one or more objects 1676 (e.g., security features such as images, holograms, watermarks, kinegrams, laser perforations, microprint, etc.), one or more properties 1678 (e.g., font, font color, font size, font style, orientation, capitalization scheme, microprint, text, etc.), position data 1680 (e.g. a bounding box template describing position(s) of one or more of at least one field, at least one field prefix, and at least one object), and a set of validation checks (e.g., direct check(s) and/or indirect check(s)).

In some implementations, a subset of checks included in an instance of a document assembly object 1656 is a "local" check, which may be specific to that document, and, in some cases, those documents related (e.g., via inheritance) to that document. In some implementations, "global" security checks may be used and applied by the document evaluator 226 to multiple documents, e.g., security checks generalized to many documents using common security features.

In some implementations, a document assembly object instance includes one or more links. For example, at least one instance of the document assembly object(s) 1656 may include links to one or more snippets (e.g., from a valid sample), where the one or more snippets may be represented in a binary image format to be used in computer-vision and similarity checks, such as those described with reference to the decision engine 310 and/or its subcomponents. Examples of context information 1658 include, but are not limited to, location (physical and/or network), IP address, device identifier (e.g., MAC, electronic serial number, etc.), user ID (e.g., name, username, etc.), facial images (e.g., from selfies and/or documents), etc. As described herein, in some implementations, the context information may be used by the decision engine 310, e.g., to identify repeated fraudulent attempts and/or users or devices associated therewith and determine a level of risk or scrutiny to which a document under test is subjected.

In some implementations, intermediate results 1660 associated with one or more documents under test are stored by the document database 242. In some implementations, the intermediate results 1660 are stored beyond the time needed by the system 100 to evaluate and verify (or not) the document under test. For example, in some implementations, the intermediary results and other information associated with that document under test (e.g., one or more of a preprocessed image, post processed image, and at least one snippet, etc.) may be archived for future use to enhance system 100 performance. For example, such information may be used to determine which intermediate results are the most frequently encountered and/or most highly predictive of fraud or invalidity so that, e.g., those evaluations may be applied by the associated component(s) of the decision engine 310 as a first tier of analysis to more efficiently triage documents under test. For example, such data may reveal that it would be more efficient in terms of time and computational resources to compare the inter-bounding box consistency of the repeated DOB information in the CADL 500 example as an early step, and only proceed to more intensive analysis (e.g., of the microprint) when that intermediate result is a "pass" and not a "fail." As another example, the intermediate results may be useful in enhancing individual evaluators, e.g., as training and/or test data, or may be used to train other models.

The intermediate results 1660 may provide transparency. For example, the intermediary results may be used to explain to the user (e.g., the person providing the image of the document), or a requesting customer (e.g., a bank requesting verification of the document), why the document under test is not verified/is rejected.

In some implementations, the intermediate results 1660 may provide auditability. For example, assume it becomes apparent that the text evaluator 1344 cannot detect a particular attack vector involving a document number and provides a false negative (e.g., the text evaluator did not previously check that the initials and DOB comprised a portion of the document number for this document); in some implementations, the document database 242 may query the decision history 1662 for documents under test of that document class that passed (e.g., as a final verification decision), where the intermediate results and pull the OCRed document number text associated therewith, so that those document numbers can be evaluated to determine which and/or how many documents were incorrectly verified and, potentially, trigger remedial action.

In some implementations, the decision history 1662 describes an overall verification decision (valid/invalid or accepted/rejected) for one or more documents under test processed by the document evaluator 226.

It should be apparent that systems, methods, features and functionalities described herein provide a number of potential benefits. For example, the systems, methods, features and functionalities described herein may provide a highly flexible decision architecture that can rapidly adapt to keep up with the highly dynamic nature of document fraud and/or provide decisions quickly and/or efficiently, even on newly issued documents.

In some implementations, the cold start problem is reduced or diminished using the computer-vision based approaches described herein. In some implementations, the computer-vision based approaches described herein may allow a previously unsupported document (e.g., newly issued) to be supported and evaluated by the system 100 more quickly (e.g., a day or two instead of weeks or months, as may be the case with (re)training an AI/ML model for the new document).

In some implementations, the systems, methods, features and functionalities described herein may detect modifications or fraud indetectable by humans. For example, sophisticated user of photo editing may be able to modify a document so that the modification/anomaly is indistinguishable to a human eye, but the systems, methods, features and functionalities described herein may, in some implementations, identify such modifications.

In some implementations, the document assembly objects may be dynamic. For example, the document assembly object may be continuously improved as newly derived security features or checks are learned and added (e.g., via a feedback loop). For example, computer-vision based approaches described herein may be layered with AI/ML models to extract new combinations of features that may be indicative of validity or invalidity or detect and neutralize new vectors of attack (e.g., fraudulent modification).

In some implementations, the systems, methods, features and functionalities described herein provide a modular architecture wherein components may be reused in the processing of multiple different documents, which may allow greater investment in the refinement and optimization of those components and allow those components to be "plug-and-play" for new documents. For example, in some implementations, one or more object detections performed by the object detection engine 308 and/or one or more evaluations performed by the decision engine 310 may be reused/reapplied on multiple different documents. For example, in some implementations, a laser or punch perforation detection model may be trained, validated, retrained, optimized, etc. to detect laser or perforations using edge detection and/or circular Hough transformation. The object detection engine 308 may then apply that previously developed model to a valid sample to generate the document assembly object and/or to documents under test to determine the presence of such security features in a newly supported document, thereby lower the barrier for supporting a new document.

Figure 24:
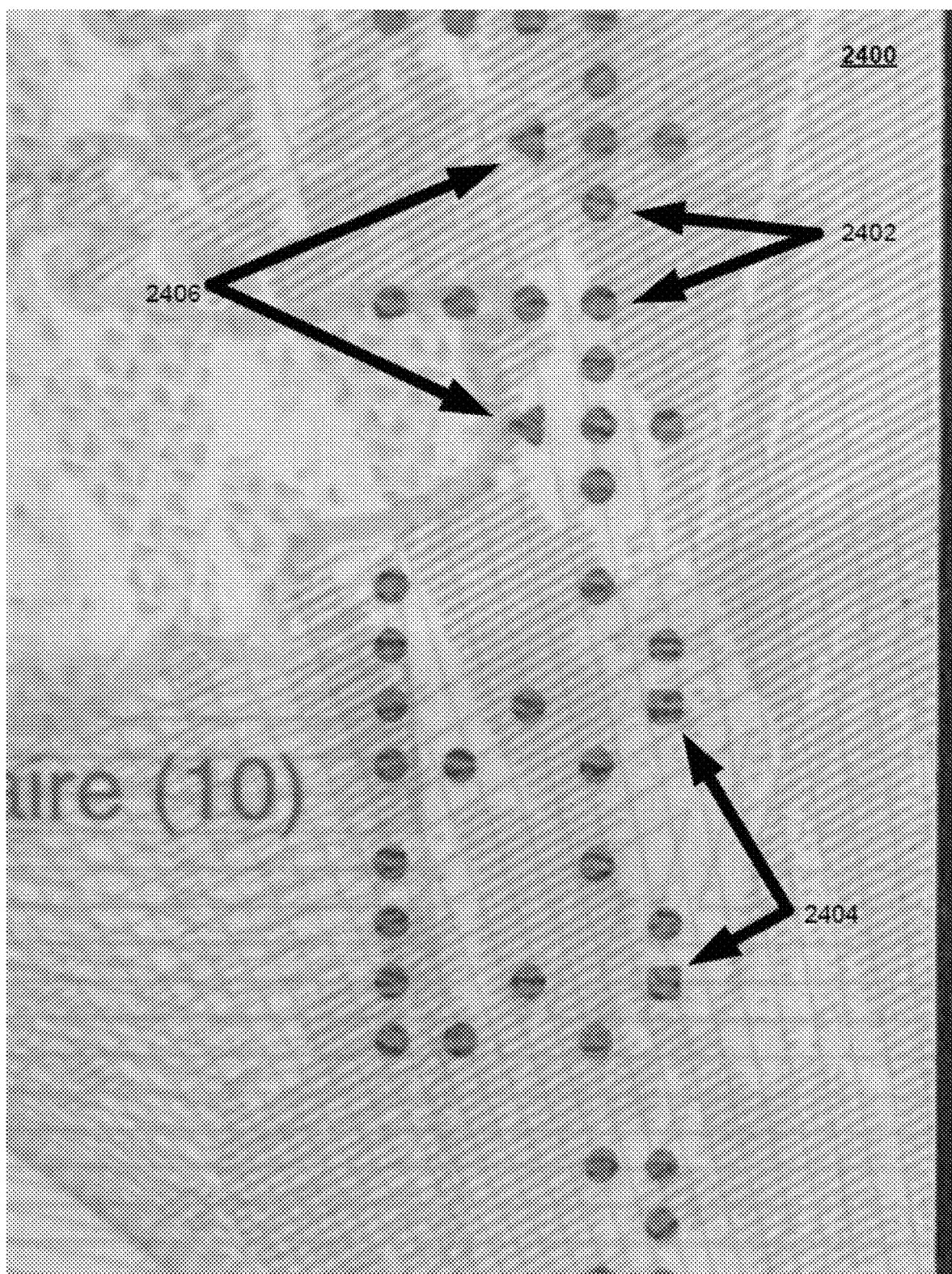
FIG. 24 illustrates an example of at least a portion of a three-dimensional area of interest including perforations in accordance with some implementations.
Figure 25:
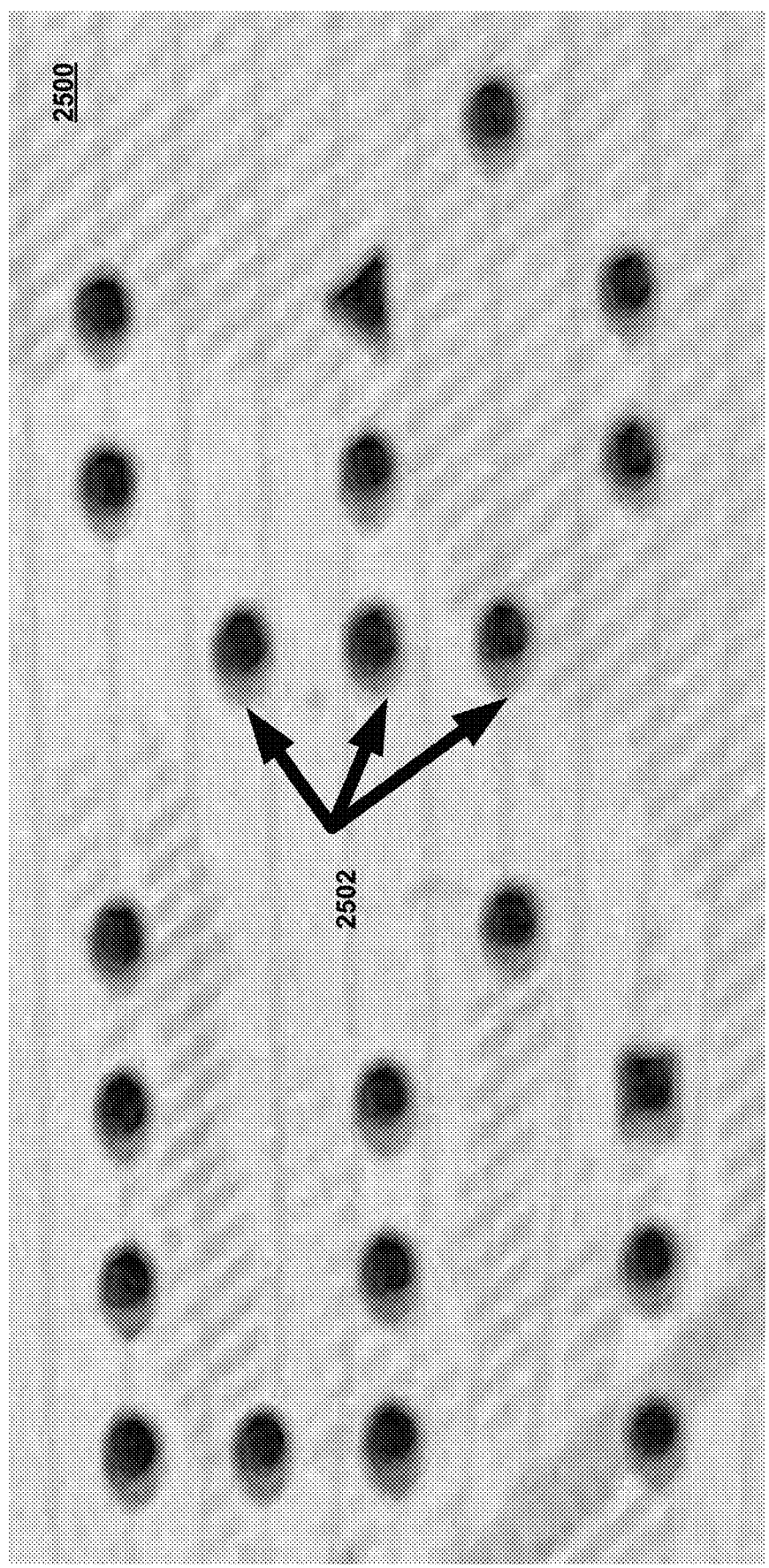
FIG. 25 illustrates another example of at least a portion of a three-dimensional area of interest including perforations in accordance with some implementations.

In some implementations, a laser or punch perforation detection model may be trained, validated, and optimized to identify one or more of the presence of perforations, their location relative to the document, the shape(s) of valid perforations, expected inter-perforation spacing, dimensions of individual perforations, background artifacts visible through a perforation, etc. and these features may be incorporated into the document assembly object. For example, referring to FIG. 24, a magnified portion 2400 of a UK passport with some laser perforations is illustrated as an example portion of an area of 3D interest in accordance with some implementations. More specifically, the magnified portion 2400 is from the back/opposite of a passport page with perforations forming the numerals "4433," when read from the front/other side of the page. The circular perforations 2402 and the triangular perforations 2406 are perforations in the two instances of the numeral "4," and the square or rectangular perforations 2404 are perforations in the two instance of the numeral "3." In some implementations, the document assembly object associated with the illustrated UK passport in FIG. 24, may include checks that, when applied by the decision engine 310, confirm that one or more of (1) the correct shape(s) are present, such as circular perforations such as those at 2402, square or rectangular perforations such those as at 2402, and triangular perforations such as those at 2406 are present in the laser perforations; (2) the perforation shape usage is as expected (e.g., a triangle appears on the top of the short vertical arm in the numeral "4," a square appears in the bottom of a "3", etc. It should be noted that such usage patterns may or may not be published by the issuer depending on the document and issuer; however, those usage patterns may be derived, e.g., using machine learning, and encoded as one or more checks in the document assembly object according to some implementations); (3) the inter-perforation spacing is correct between perforations within the same character and/or between perforations of different character; and (4) visual artifacts associated with the perforations and consistent with three-dimensionality are present, e.g., shadow, reflection, or page thickness artifacts at the edge of a perforation or content visible through the perforation. For example, in FIG. 24, under magnification content (text or microprint) on the following page is visible on the next page is visible through the perforations, those artifacts/that content also varies from perforation to perforation, which would not be true if a nefarious user used photoshop to create grey dots or copy-pasted a single perforation repeatedly to produce an image that under normal magnification approximated the appearance of a laser perforation, and the presence, absence, consistency or inconsistency of such artifacts may be indicative of validity or invalidity. As another example, in FIG. 25, a magnified portion 2500 of an area of interest from an image of a UK passport document under test and including laser perforations (i.e., an example of a 3D security feature) is illustrated. In FIG. 25, the image of the document under test from which portion 2500 is taken was taken at an angle to the right of square/normal to the document. As a result, the thickness of the page in which the perforations are made is visible as thickness artifacts. For example, the crescent shaped thickness artifacts 2502 at the edge of the circular perforations, as well as artifacts on edges of the triangular and square perforations, which are not labeled herein. Even applying a subset of the perforation detection and analysis techniques described herein, a greater than 90% detection rate of valid or tampered with perforations has been achieved.

In some implementations, the modularity provides efficient and quick support of newly developed security features. For example, assume that watermarks are a newly developed security feature not previously used by issuers and are starting to be implemented in new documents, in some implementations, a model or algorithm to detect that new security feature as an object may be trained, and the object detection engine 308 may then call and apply that object detection model/algorithm moving forward, thereby incrementally building out support for new security features as they are developed without disruption to existing systems or architecture. A previously generated document assembly object may be modified to add that the document includes a watermark along with associated information (e.g., bounding box location) and verification check, when the document included the watermark, but the system 100 did not previously support and evaluate watermarks, e.g., because the method/model for detecting UV watermarks had not been developed at the time the document assembly object was initially created.

In some implementations, the systems, methods, features and functionalities described herein allow for faster processing and return of result(s). For example, in some implementations, the intermediate evaluations, sometimes also referred to as verification checks, are decoupled and/or may be performed asynchronously. As an example, the microprint of multiple snippets may be evaluated in series and/or parallel to determine, which may occur in series or in parallel with other evaluations, such as consistency checks between the content of multiple text fields and/or objects. As another example, evaluations/verification checks may be tiered, so that results may be returned more quickly. For example, a set of security features associated with recent fraud attempts using a particular document may be checked/evaluated first to triage requests involving that document classification, and when those initial checks are passed, additional checks may or may not be performed. As another example, the number and/or types of checks and evaluations may vary depending on a risk assessment, e.g., how likely the document under test is likely to be invalid, so documents that are more frequently used by fraudsters, or that come from sources (e.g., devices, IP addresses, countries, etc.) associated with prior invalid attempts, etc. may receive additional scrutiny via the use of more evaluations, while lower risk documents may be evaluated using fewer and/or less (time or computationally) intensive evaluations, such as average color value comparison vs a CNN for evaluating the microprint, thereby improving system throughput, efficiency, and costs while mitigating the risk of false negatives.

In some implementations, the generation and/or persistence in the document database of the intermediary results may provide auditability. For example, assume it becomes apparent that the decision engine 310 is not detecting a particular attack vector and provides a false negative (e.g., the text evaluator did not previously check that the initials and DOB comprised a portion of the document number for a particular class of document). In some implementations, document assembly object may be updated to include a verification check regarding whether a first identified portion of the document number is consistent with the DOB and a second identified portion of the document number is consistent with the initials extracted from the name fields. In some implementations, the document database 242 may query the decision history 1662 for documents of that document class which that passed (e.g., as an overall verification decision) and had valid intermediate result(s) associated with the document number. In some implementations, the decision engine 310 or a portion thereof (e.g., the inter-bounding box's content consistency evaluator 1324) may be executed to determine whether, which, or how many documents were incorrectly verified and, potentially, trigger remedial action.

In some implementations, the generation and/or persistence in the document database of the intermediary results may provide transparency. For example, the intermediate result(s) may be used to at least partially explain a rejection or acceptance of a document under test. Such transparency may be help in compliance to demonstrate that acceptances or rejections are based on appropriate criteria and not inappropriate or forbidden criteria (e.g., race, sex, country of origin, etc.).

In some implementations, the systems, methods, features and functionalities described herein may be layered with others. For example, the systems, methods, features and functionalities described herein may, in some implementations, be used in conjunction with liveness detection, so that, when an identification document is valid, a liveness detector (not shown) may determine whether a user that submitted the document is live and whether his/her face matches the photo in the ID.

As another example, in some implementations, the systems, methods, features and functionalities described herein may, in some implementations, be layer with human auditors or reviewers, who may confirm and/or reject an intermediate or overall result or may be looped in under certain circumstances or predefined criteria.

For example, in some implementations, the systems, methods, features and functionalities described herein may be layered with machine learning. For example, to perform additional validity checks or modify the evaluations performed by the decision engine 310 (e.g., change an order of evaluations, change a risk tier in a document assembly object thereby changing the evaluations to which those documents under test are subjected, perform a feature set reduction and reduce the number of verification checks in the document assembly object or which verification checks are performed on a document, etc.). In some implementations, the use of computer-vision and simple matching algorithms is robust compared to and may supplement a more volatile machine learning data extraction pipeline and/or provide a set of signals, which may be weak individually, for stacking in a machine learning model.

Example Methods

FIGS. 17-21 are flowcharts of example methods that may, in accordance with some implementations, be performed by the systems described above with reference to FIGS. 1-4, 13, and 16. The example methods 1700, 1800, 1900, 2000, and 2100 of FIGS. 17-21 are provided for illustrative purposes, and it should be understood that many variations exist and are within the scope of the disclosure herein.

Figure 17:
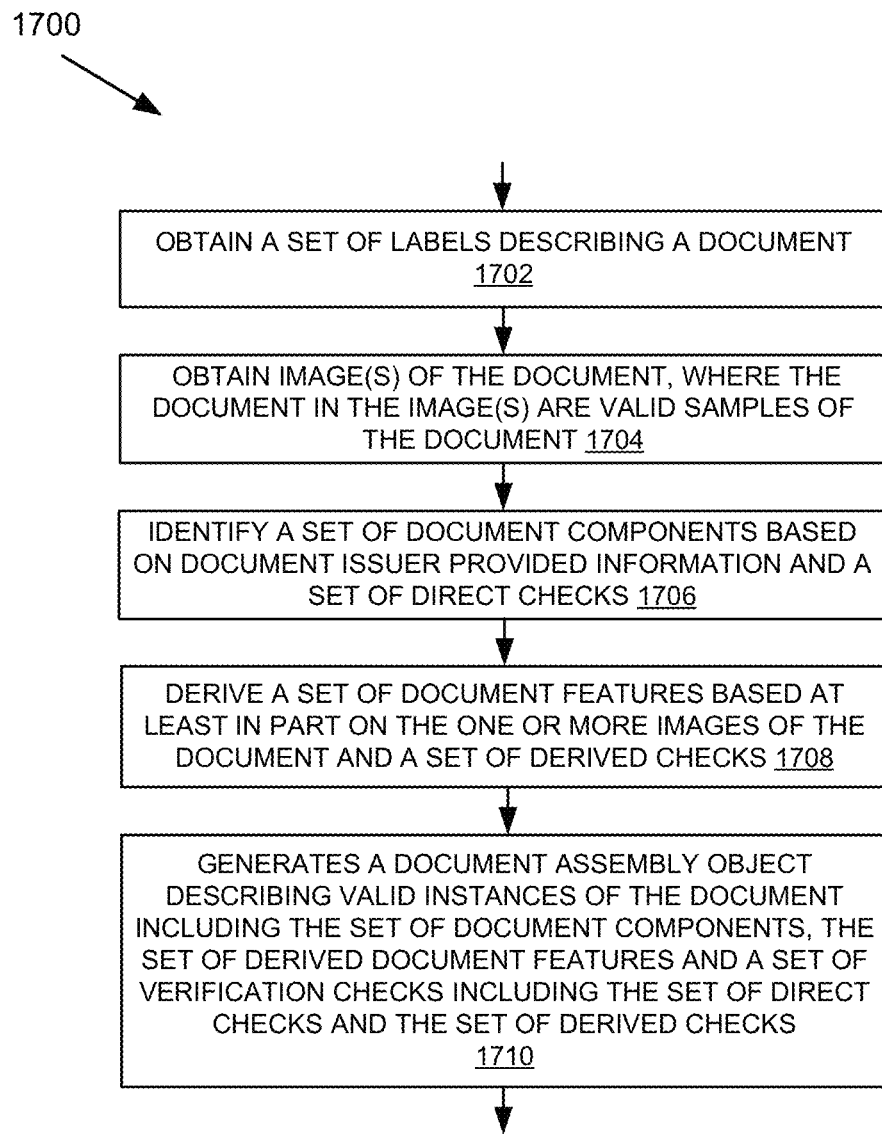
FIG. 17 is a flowchart of an example method for generating a document assembly object in accordance with some implementations.

FIG. 17 is a flowchart of an example method 1700 for generating a document assembly object in accordance with some implementations. At block 1702, the document class labeler 404 obtains a set of labels describing a document. At block 1704, the sample obtainer 402 obtains one or more images of the document, wherein the document in the one or more images are valid samples of the document. At block 1706, the issuer information encoder 406 identifies a set of document components based on document issuer provided information and a set of direct checks. At block 1708, the derived information encoder 408 derives a set of document features based at least in part on the one or more images of the document and a set of derived checks. At block 1710, the document configurator 304 generates a document assembly object describing valid instances of the document including the set of document components, the set of derived document features and a set of verification checks including the set of direct checks and the set of derived checks.

Figure 18:
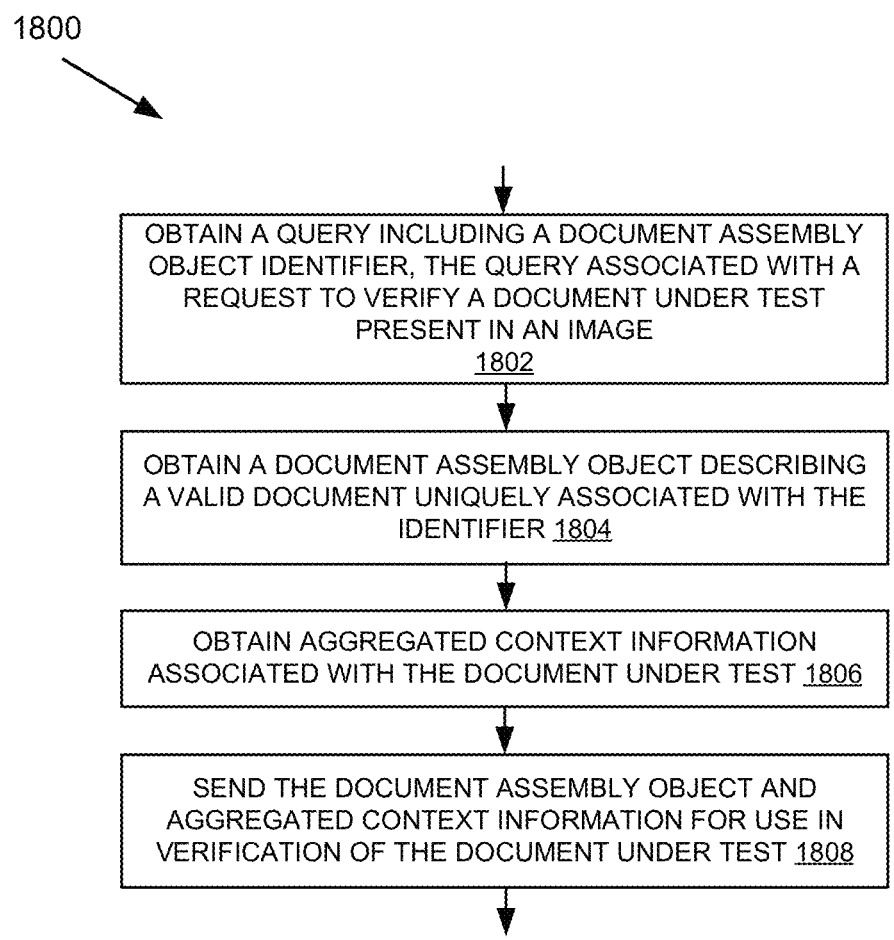
FIG. 18 is a flowchart of an example method for processing a request to verify a document under test using a document assembly object in accordance with some implementations.

FIG. 18 is a flowchart of an example method 1800 for processing a request to verify a document under test using a document assembly object in accordance with some implementations. At block 1802, the document database 242 obtains a query including a document assembly object identifier, the query associated with a request to verify a document under test present in an image. At block 1804, the document database 242 obtains a document assembly object describing a valid document uniquely associated with the identifier, the document assembly object including: a set of document components, a set of derived document features, and a set of verification checks including one or more of a direct check and a derived check. At block 1806, the document database 242 obtains aggregated context information associated with the document under test. At block 1808, the document database 242 sends the document assembly object and aggregated context information for use in verification of the document under test.

Figure 19:
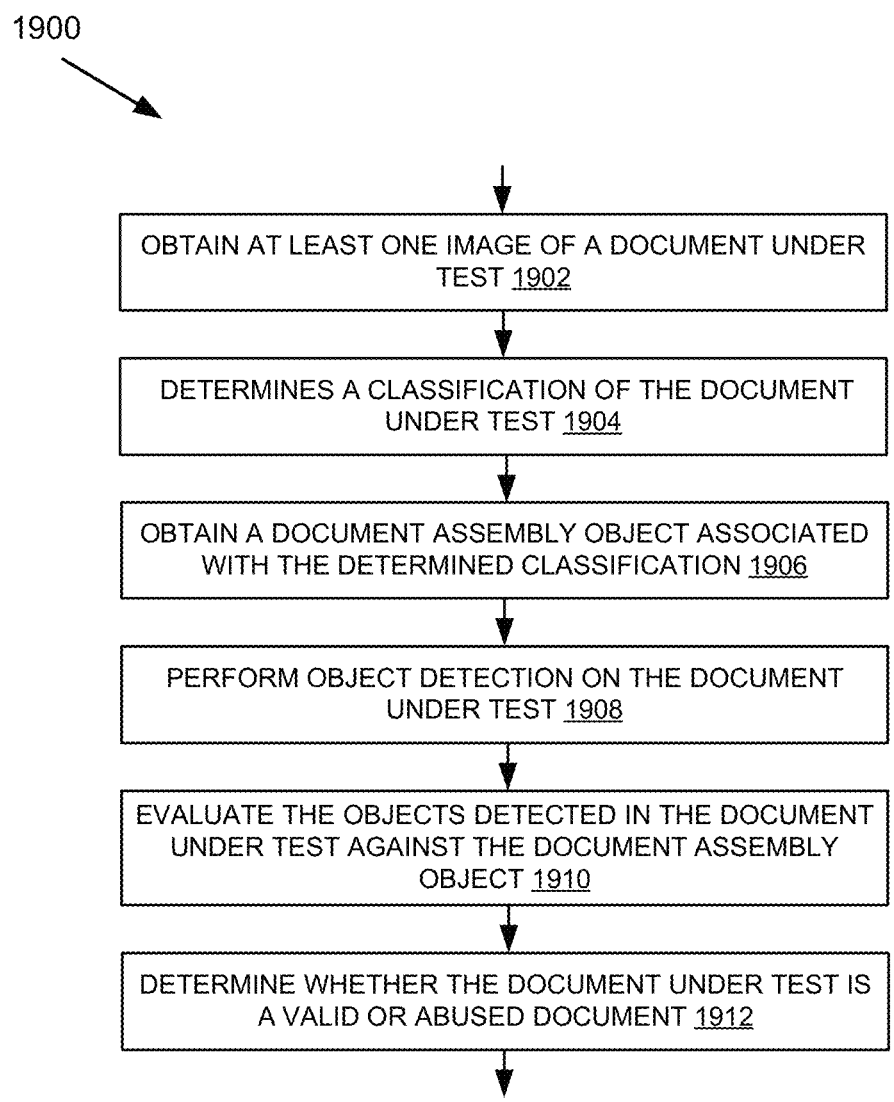
FIG. 19 is a flowchart of an example method for evaluating a document under test in accordance with some implementations.

FIG. 19 is a flowchart of an example method 1900 for evaluating a document under test in accordance with some implementations. At block 1902, the document classifier 1302 obtains at least one image of a document under test. At block 1904, the document classifier 1302 determines a classification of the document under test. At block 1906, the document assembly object obtainer 1304 obtains a document assembly object associated with the classification determined at block 1904. At block 1908, the OCR engine 306 and/or object detection engine 308 performs object (e.g., text or other object) detection on the document under test. At block 1910, one or more of the bounding box presence/absence evaluator 1308, the inter-bounding box evaluator 1310, and the intra-bounding box evaluator 1312 evaluate the objects detected in the document under test against the document assembly object obtained at block 1906. At block 1912, the verification determiner 1314 determines whether the document under test is a valid or abused document.

Figure 20:
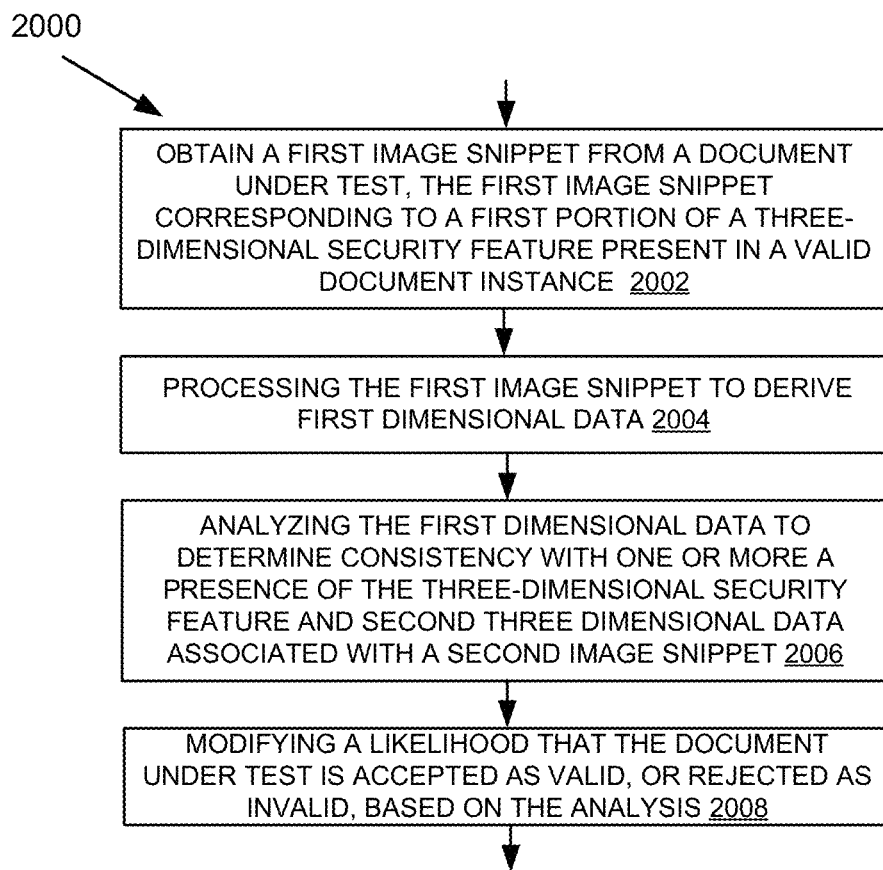
FIG. 20 is a flowchart of an example method for evaluating a three-dimensional security feature in accordance with some implementations.

FIG. 20 is a flowchart of an example method 2000 for evaluating a three-dimensional security feature in accordance with some implementations. At block 2002, the 3D presence evaluator 1346 obtains a first image snippet from a document under test, where the first snippet corresponds to a first portion of a three-dimensional security feature present in a valid document instance. At block 2004, the 3D presence evaluator 1346 processes the first image snippet to derive first dimensional data. At block 2006, one or more of the 3D presence evaluator 1346 analyzes the first dimensional data to determine consistency with a presence of the three-dimensional security feature and the 3D consistency evaluator 1328 analyzes the first dimensional data to determine consistency the second three-dimensional data associated with a second image snippet. At block 2008, the verification determiner 1314 modifies, based on the analysis at block 2006, a likelihood that the document under test is accepted as valid or rejected as invalid.

Figure 21:
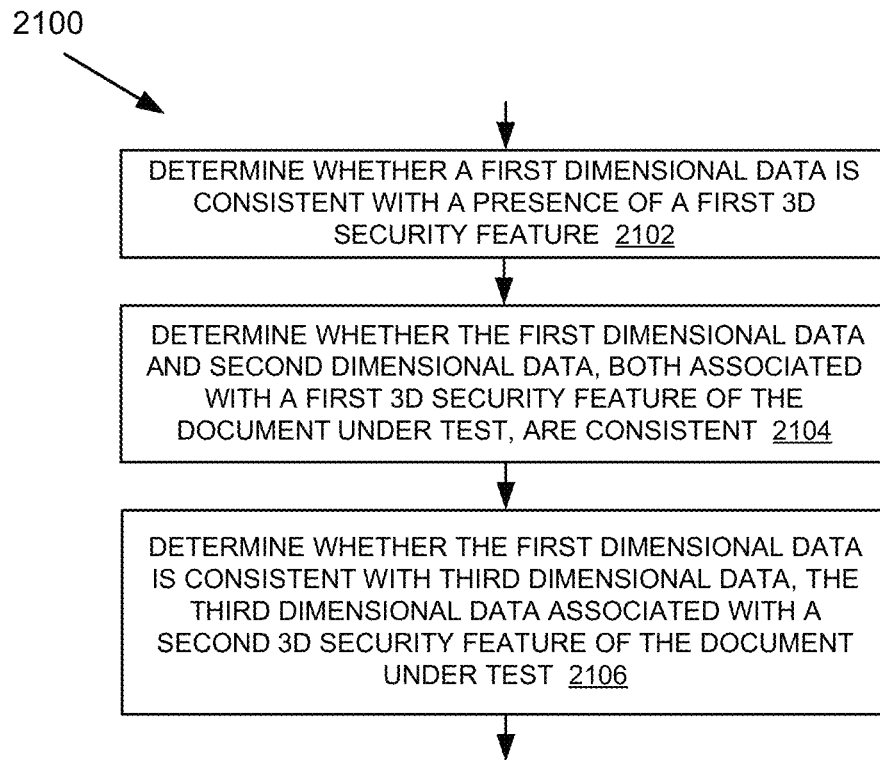
FIG. 21 is a flowchart of an example method for evaluating dimensional data in accordance with some implementations.

FIG. 21 is a flowchart of an example method 2100 for evaluating dimensional data to determine whether dimensional data associated with a first portion of a document under test is consistent with a presence of a three-dimensional security feature as well as other dimensional data associated with the same 3D security feature and a different 3D security feature in accordance with some implementations. At block 2102, the 3D presence evaluator 1346 determines whether a first dimensional data is consistent with a presence of a first 3D security Feature. At block 2104, the 3D consistency evaluator 1328 Determine whether the first dimensional data and second dimensional data, both associated with a first 3D security feature of the document under test, are consistent. At block 2106, the 3D consistency evaluator 1328 determines whether the first dimensional data is consistent with third dimensional data, the third dimensional data associated with a second 3D security feature of the document under test. In some implementations, blocks 2102-2104 may be repeated, not shown, to test different permutations or combinations of portions of 3D security features for internal or inter-3D security feature consistency or a lack thereof.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   obtaining, using one or more processors, at least one image of a document, wherein valid instances of the document include at least a first three-dimensional security feature;
   obtaining, using the one or more processors, a first image snippet from the document, the first image snippet corresponding to at least a first portion of the first three-dimensional security feature present in the valid instances of the document;
   deriving, using the one or more processors, first dimensional data associated with the first image snippet;
   analyzing, using the one or more processors, the first dimensional data to determine one or more of:
      whether the first dimensional data is consistent with a presence of the first three-dimensional security feature, and
      whether the first dimensional data is consistent with second dimensional data, wherein the second dimensional data corresponds to one of: a second portion of the first three-dimensional security feature in the valid instances of the document and at least a portion of a second three-dimensional security feature in the valid instances of the document; and
   modifying, using one or more processors, a likelihood that the document under test is accepted as valid, or rejected as invalid, based on the analysis of the first dimensional data.

2. The method of claim 1, the method further comprising:
   obtaining a second image snippet from the image of the document; and
   deriving the second dimensional data associated with the second image snippet,
   wherein the first three-dimensional security feature includes a set of tactile text,
   wherein the first dimensional data and first image snippet correspond to the first portion of the first three-dimensional security feature by representing a first character in the set of tactile text, and
   wherein the second dimensional data and second image snippet correspond to the second portion of the first three-dimensional security feature by representing a second character in the set of tactile text.

3. The method of claim 1, wherein deriving the first dimensional data includes:
   determining, for each pixel in a set of pixels within the first image snippet, an intensity;
   assigning a first subset of pixels that satisfy an intensity threshold to a first color;
   assigning a second subset of pixels that fail to satisfy the intensity threshold to a second color; and
   generating, as the first dimensional data, a first and second color version of the first image snippet.

4. The method of claim 1, wherein determining whether the first dimensional data is consistent with the presence of the first three-dimensional security feature includes:
   determining whether the first dimensional data is indicative of specular reflection; and
   responsive to determining that the first dimensional data is not indicative of specular reflection, determining that first dimensional data is inconsistent with the presence of the first three-dimensional security feature.

5. The method of claim 1, wherein deriving the first dimensional data includes:
   identifying color variation within the first image snippet, wherein a color variation in portions of the first three-dimensional security feature known to have a common color is determined to be indicative of three-dimensionality.

6. The method of claim 1, wherein deriving the first dimensional data includes:
   applying nearest neighbor analysis to the first image snippet.

7. The method of claim 1, wherein deriving the first dimensional data includes:
generating a depth map from stereoscopic images of the document, the depth map indicating whether portion of the document associated with the first image snippet is three dimensional.

8. The method of claim 1, wherein determining whether the first dimensional data is consistent with the second dimensional data is based at least in part on determining a common light source.

9. The method of claim 8, wherein determining the common light source is based on one or more of specular reflection and ray tracing.

10. The method of claim 1, wherein determining whether the first dimensional data is consistent with second dimensional data is determined subsequent to determining that the first dimensional data is consistent with the presence of the first three-dimensional security feature.

11. A system comprising:
a processor; and
a memory, the memory storing instructions that, when executed by the processor, cause the system to:
obtain at least one image of a document, wherein valid instances of the document include at least a first three-dimensional security feature;
obtain a first image snippet from the document-under test, the first image snippet corresponding to at least a first portion of the first three-dimensional security feature present in the valid instances of the document;
derive first dimensional data associated with the first image snippet;
analyze the first dimensional data to determine one or more of:
whether the first dimensional data is consistent with a presence of the first three-dimensional security feature, and
whether the first dimensional data is consistent with second dimensional data, wherein the second dimensional data corresponds to one of: a second portion of the first three-dimensional security feature in the valid instances of the document and at least a portion of a second first three-dimensional security feature in the valid instances of the document; and
modify a likelihood that the document is accepted as valid, or rejected as invalid, based on the analysis of the first dimensional data.

12. The system of claim 11, includes instructions that, when executed, cause the system to:
obtain a second image snippet from the image of the document; and
derive the second dimensional data associated with the second image snippet,
wherein the first three-dimensional security feature includes a set of tactile text,
wherein the first dimensional data and first image snippet correspond to the first portion of the first three-dimensional security feature by representing a first character in the set of tactile text, and
wherein the second dimensional data and second image snippet correspond to the second portion of the first three-dimensional security feature by representing a second character in the set of tactile text.

13. The system of claim 11, wherein deriving the first dimensional data includes:
determining, for each pixel in a set of pixels within the first image snippet, an intensity;
assigning a first subset of pixels that satisfy an intensity threshold to a first color;
assigning a second subset of pixels that fail to satisfy the intensity threshold to a second color; and
generating, as the first dimensional data, a first and second color version of the first image snippet.

14. The system of claim 11, wherein determining whether the first dimensional data is consistent with the presence of the first three-dimensional security feature includes:
determining whether the first dimensional data is indicative of specular reflection; and
responsive to determining that the first dimensional data is not indicative of specular reflection, determining that first dimensional data is inconsistent with the presence of the first three-dimensional security feature.

15. The system of claim 11, wherein deriving the first dimensional data includes:
identifying color variation within the first image snippet, wherein a color variation in portions of the first three-dimensional security feature known to have a common color is determined to be indicative of three-dimensionality.

16. The system of claim 11, wherein deriving the first dimensional data includes:
applying nearest neighbor analysis to the first image snippet.

17. The system of claim 11, wherein deriving the first dimensional data includes:
generating a depth map from stereoscopic images of the document, the depth map indicating whether portion of the document associated with the first image snippet is three dimensional.

18. The system of claim 11, wherein determining whether the first dimensional data is consistent with the second dimensional data is based at least in part on determining a common light source.

19. The system of claim 18, wherein determining the common light source is based on one or more of specular reflection and ray tracing.

20. The system of claim 11, wherein determining whether the first dimensional data is consistent with second dimensional data is determined subsequent to determining that the first dimensional data is consistent with the presence of the first three-dimensional security feature.

* * * * *